United States Patent
Tomuta et al.

(10) Patent No.: US 10,086,402 B2
(45) Date of Patent: Oct. 2, 2018

(54) TOOL FOR APPLYING A FLUID ONTO A SURFACE

(71) Applicant: The Boeing Company, Chicago, IL (US)

(72) Inventors: Raul Tomuta, Long Beach, CA (US);
Richard Philip Topf, Orange, CA (US);
Angelica Davancens, Reseda, CA (US);
Martin Hanna Guirguis, Long Beach, CA (US); Don David Trend, Huntington Beach, CA (US); Ilya Sedler, Huntington Beach, CA (US); Cris Howard Garcia, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 15/057,090

(22) Filed: Feb. 29, 2016

(65) Prior Publication Data
US 2016/0175883 A1 Jun. 23, 2016

Related U.S. Application Data

(62) Division of application No. 14/016,846, filed on Sep. 3, 2013.

(51) Int. Cl.
*B05D 1/28* (2006.01)
*A46B 11/06* (2006.01)
(Continued)

(52) U.S. Cl.
CPC ............... *B05D 1/28* (2013.01); *A46B 9/005* (2013.01); *A46B 9/025* (2013.01); *A46B 11/06* (2013.01);
(Continued)

(58) Field of Classification Search
CPC combination set(s) only.
See application file for complete search history.

(56) References Cited

U.S. PATENT DOCUMENTS

| 1,003,650 A | 9/1911 | Redin |
| 1,988,557 A | 1/1935 | Jecker |

(Continued)

FOREIGN PATENT DOCUMENTS

| CA | 2858185 A1 | 3/2015 |
| CN | 1439999 A | 9/2003 |

(Continued)

OTHER PUBLICATIONS

Canadian Intellectual Property Office Examination Report, dated Apr. 21, 2017, regarding Application No. 2,855,480, 4 pages.
(Continued)

*Primary Examiner* — David Walczak
(74) *Attorney, Agent, or Firm* — Yee & Associates, P.C.

(57) ABSTRACT

A method and apparatus for applying a fluid onto a number of surfaces. In one illustrative example, an apparatus may comprises a base having a number of channels, a number of flexible members extending from the base, and an applicator extending from the base on a same side as the number of flexible members. A flexible member in the number of flexible members may have a fluid channel connected to at least one of the number of channels in the base to allow a fluid flowing through the number of channels to flow out of the fluid channel. The applicator may be configured to apply the fluid flowing out of the number of flexible members onto a number of surfaces.

26 Claims, 20 Drawing Sheets

(51) Int. Cl.
*A46B 9/00* (2006.01)
*A46B 9/02* (2006.01)
*B64F 5/10* (2017.01)
*B05C 1/06* (2006.01)

(52) U.S. Cl.
CPC .............. *A46B 11/063* (2013.01); *B64F 5/10* (2017.01); *A46B 2200/20* (2013.01); *A46B 2200/3013* (2013.01); *B05C 1/06* (2013.01)

(56) References Cited

U.S. PATENT DOCUMENTS

| | | |
|---|---|---|
| 2,126,999 A | 8/1938 | Mitchell |
| 2,227,792 A | 1/1941 | Norton, Jr. |
| 2,608,705 A | 9/1952 | Duff |
| 2,609,974 A | 9/1952 | Brous |
| 2,824,443 A | 2/1958 | Ames |
| 2,978,722 A | 4/1961 | Kusakabe |
| 3,661,679 A | 5/1972 | Law |
| 3,746,253 A | 7/1973 | Walberg |
| 3,865,525 A | 2/1975 | Dunn |
| 3,888,421 A | 6/1975 | Chow |
| 3,963,180 A | 6/1976 | Wagner |
| 4,239,157 A | 12/1980 | Fasth |
| 4,570,834 A | 2/1986 | Ward |
| 4,635,827 A | 1/1987 | Roedig |
| 4,698,005 A | 10/1987 | Kikuchi et al. |
| 4,925,061 A | 5/1990 | Jeromson, Jr. et al. |
| 4,932,094 A | 6/1990 | McCowin |
| 4,944,459 A | 7/1990 | Watanabe et al. |
| 4,948,016 A | 8/1990 | Summons et al. |
| 4,989,792 A | 2/1991 | Claassen |
| 5,017,113 A | 5/1991 | Heaton et al. |
| 5,060,869 A | 10/1991 | Bekius |
| 5,186,563 A | 2/1993 | Gebhard et al. |
| 5,271,521 A | 12/1993 | Noss et al. |
| 5,271,537 A | 12/1993 | Johnson |
| 5,319,568 A | 6/1994 | Bezaire |
| 5,346,380 A | 9/1994 | Ables |
| 5,462,199 A | 10/1995 | Lenhardt |
| 5,480,487 A | 1/1996 | Figini et al. |
| 5,571,538 A | 11/1996 | Cloud |
| 5,615,804 A | 4/1997 | Brown |
| 5,803,367 A | 9/1998 | Heard et al. |
| 5,906,296 A | 5/1999 | Martindale et al. |
| 5,920,974 A | 7/1999 | Bullen |
| 5,976,631 A | 11/1999 | Ramachandran |
| 5,992,686 A | 11/1999 | Cline et al. |
| 5,995,909 A | 11/1999 | Bretmersky et al. |
| 6,001,181 A | 12/1999 | Bullen |
| 6,082,587 A | 7/2000 | Martindale et al. |
| 6,213,354 B1 | 4/2001 | Kay |
| 6,471,774 B1 | 10/2002 | Krueger |
| 6,698,617 B1 | 3/2004 | Szymanski |
| 6,739,483 B2 | 5/2004 | White et al. |
| 6,935,541 B1 | 8/2005 | Campbell et al. |
| 6,942,736 B2 | 9/2005 | Chinander et al. |
| 6,986,472 B2 | 1/2006 | Gordon |
| 7,032,839 B2 | 4/2006 | Blette et al. |
| 7,172,096 B2 | 2/2007 | O'Dougherty |
| 7,275,663 B2 | 10/2007 | Campbell et al. |
| 7,578,416 B2 | 8/2009 | Underwood |
| 7,592,033 B2 | 9/2009 | Buckley et al. |
| 7,815,132 B2 | 10/2010 | Baltz |
| 7,922,107 B2 | 4/2011 | Fox |
| 8,181,822 B2 | 5/2012 | Doelman et al. |
| 8,430,592 B2 * | 4/2013 | Castellana ......... A46B 11/0006 401/189 |
| 8,453,876 B2 | 6/2013 | Miller |
| 8,534,499 B2 | 9/2013 | Williams et al. |
| 8,651,046 B1 | 2/2014 | Davancens et al. |
| 9,016,530 B2 | 4/2015 | Topf et al. |
| 9,095,872 B2 | 8/2015 | Topf et al. |
| 2001/0038039 A1 | 11/2001 | Schultz et al. |
| 2003/0156401 A1 | 8/2003 | Komine et al. |
| 2004/0129208 A1 | 7/2004 | Nolte et al. |
| 2004/0192524 A1 | 9/2004 | Nolte et al. |
| 2005/0145724 A1 | 7/2005 | Blette et al. |
| 2006/0081175 A1 | 4/2006 | Nagase |
| 2008/0083371 A1 | 4/2008 | Clifford et al. |
| 2009/0291196 A1 | 11/2009 | Morris et al. |
| 2010/0260531 A1 | 10/2010 | Rademacher |
| 2011/0297175 A1 | 12/2011 | Pires et al. |
| 2012/0273115 A1 | 11/2012 | Suzuki et al. |
| 2014/0234011 A1 | 8/2014 | Tomuta et al. |
| 2014/0326760 A1 | 11/2014 | Topf et al. |
| 2015/0028051 A1 | 1/2015 | Topf et al. |
| 2015/0044376 A1 | 2/2015 | Topf et al. |
| 2015/0053787 A1 | 2/2015 | Tomuta et al. |
| 2015/0064357 A1 | 3/2015 | Tomuta et al. |
| 2016/0175883 A1 | 6/2016 | Tomuta et al. |

FOREIGN PATENT DOCUMENTS

| | | |
|---|---|---|
| CN | 101858456 B | 12/2012 |
| CN | 104136130 A | 11/2014 |
| DE | 102004027789 A1 | 2/2005 |
| DE | 202005005619 U1 | 2/2006 |
| DE | 102004042211 A1 | 3/2006 |
| DE | 102008010169 A1 | 9/2009 |
| DE | 202007019244 U1 | 8/2011 |
| DE | 102010030375 A1 | 12/2011 |
| EP | 0181483 A1 | 5/1986 |
| EP | 1245348 A1 | 10/2002 |
| EP | 1425107 B1 | 5/2006 |
| EP | 2277631 A1 | 1/2011 |
| EP | 2839885 A1 | 2/2015 |
| EP | 2842457 A1 | 3/2015 |
| EP | 2956245 A1 | 12/2015 |
| FR | 2508350 A1 | 12/1982 |
| GB | 2282554 A | 4/1995 |
| GB | 2481299 A | 12/2011 |
| JP | S4929616 A | 3/1974 |
| JP | S5016734 A | 2/1975 |
| JP | S52142747 A | 11/1977 |
| JP | S5827672 A | 3/1983 |
| JP | S5924172 U | 2/1984 |
| JP | S61187269 U | 11/1986 |
| JP | S625856 U | 1/1987 |
| JP | S62148379 U | 9/1987 |
| JP | H0395697 U | 9/1991 |
| JP | H04038459 A | 2/1992 |
| JP | H04083549 A | 3/1992 |
| JP | H05154428 A | 6/1993 |
| JP | H09314305 A | 12/1997 |
| JP | H11262717 A | 9/1999 |
| JP | 2002059049 A | 2/2002 |
| JP | 2002192345 A | 7/2002 |
| JP | 2002280798 A | 9/2002 |
| JP | 2005138260 A | 6/2005 |
| JP | 2010034571 A | 2/2010 |
| JP | 20105518 A | 7/2011 |
| JP | 2015047602 A | 3/2015 |
| WO | WO0067915 A1 | 11/2000 |
| WO | WO2004073883 A | 9/2004 |
| WO | WO2005012845 A2 | 2/2005 |
| WO | WO2010093494 A1 | 8/2010 |
| WO | WO2011108358 A2 | 9/2011 |
| WO | WO2013112178 A1 | 8/2013 |
| WO | WO2014126675 A1 | 8/2014 |

OTHER PUBLICATIONS

State Intellectual Property Office of PRC Notification of First Office Action and English Translation, dated Apr. 24, 2017, regarding Application No. 201480045021.3, 19 pages.

Office Action, dated May 19, 2017, regarding U.S. Appl. No. 13/973,528, 23 pages.

Notice of Allowance, dated Apr. 19, 2017, regarding U.S. Appl. No. 13/963,218, 20 pages.

European Patent Office Communication, dated Nov. 30, 2016, regarding Application No. EP14703214.8, 6 pages.

(56) References Cited

OTHER PUBLICATIONS

State Intellectual Property Office of PRC Notification of First Office Action and English Translation, dated Nov. 28, 2016, regarding Application No. 201480008306X, 42 pages.
Canadian Intellectual Property Office Examination Report, dated Dec. 21, 2016, regarding Application No. 2,898,323, 3 pages.
"PPG Semco® Fillet Nozzles," PPG Aerospace, [online], [retrieved on Aug. 21, 2013] Retrieved online from<http://www.ppg.com/coatings/aerospace/semcoappsys/ semcosystems/semcopkgproducts/nozzlessmoothingtools/Pages/filletNozzles.aspx>, 2 pages.
"PPG Semco® Specialty Application Nozzles, Technical Data," PPG Industries Semco Packaging & Application Systems, [online] [retrieved on Aug. 21, 2013] Retrieved online from <http://www.ppg.com/coating/aerospace/semcoplg/semco_specialtLapplication_nozzels.pdf> 2 pages.
"569 FOA Feb. 8, 2016Final Office Action, dated Feb. 8, 2016, regarding U.S. Appl. No. 13/769,569, 18 pages."
"569 OA Jun. 17, 2016Office Action, dated Jun. 17, 2016, regarding U.S. Appl. No. 13/769,569, 13 pages."
"218 OA Nov. 19, 2015Office Action, dated Nov. 19, 2015, regarding U.S. Appl. No. 13/963,218, 54 pages."
"218 FOA Jun. 3, 2016Final Office Action, dated Jun. 3, 2016 regarding U.S. Appl. No. 13/963,218, 17 pages."
"218 OA Oct. 7,2016Office Action, dated Oct. 7, 2016 regarding U.S. Appl. No. 13/963,218, 14 pages."
"528 OA Sep. 22, 2016Office Action, dated Sep. 22, 2016, regarding U.S. Appl. No. 13/973,528, 71 pages."
"528 FOA Dec. 23, 2016Final Office Action, dated Dec. 23, 2016, regarding U.S. Appl. No. 13/973,528, 22 pages."
International Search Report and Written Opinion, dated Apr. 4, 2014, regarding Application No. PCT/US2014/011879, 9 pages.
International Search Report and Written Opinion, dated Jun. 4, 2014, regarding Application No. PCT/US2014/033738, 9 pages.
International Search Report and Written Opinion, dated Oct. 7, 2014, regarding Application No. PCT/US2014/040989, 10 pages.
Extended European Search Report, dated Oct. 15, 2014, regarding Application No. 14175644.5, 6 pages.
International Search Report and Written Opinion, dated Oct. 15, 2014, regarding Application No. PCT/US2014/045018, 9 pages.
Extended European Search Report, dated Jan. 8, 2015, regarding Application No. EP14180160.5, 6 pages.
Canadian Intellectual Property Office Examination Search Report, dated Jun. 10, 2015, regarding Application No. 2,858,185, 5 pages.
Canadian Intellectual Property Office Examination Search Report, dated Aug. 5, 2015, regarding Application No. 2,855,480, 4 pages.
""""Compliance Nozzle,"" 1208-178-000 part specifications, Sealant Equipment and Engineering, Inc., 2 pages, accessed Apr. 9, 2013,http://sealantequipment.com/pdf/DispenseValves/1208-178%20Compliance%20Nozzle.pdf".
""""Dispense Valves for Adhesives, Sealants, Lubricants, Epoxy, Polyurethane, Silicone & More,"" Kiss, No-Drip, Snuf-Bak, Tip-Seal,Manual, Metering, and High Flow valve part specifications, Sealant Equipment and Engineering, Inc., 12 pages, accessed Apr. 9, 2013,http://www.sealantequipment.com/dispensevalves-1part.html".

""""No-Drip Air Operated Fluid Dispense Valve,"" 2100-108 Series part specifications, Sealant Equipment and Engineering, Inc., 2 pages, accessed Apr. 9, 2013,http://www.sealantequipment.com/pdf/DispenseValves/2100-108%20No-Drip%20Valves.pdf".
"535 OA Oct. 1, 2014Office Action, dated Oct. 1, 2014, regarding U.S. Appl. No. 13/886,535, 17 pages."
"535 NOA Dec. 19, 2014Notice of Allowance, dated Dec. 19, 2014, regarding U.S. Appl. No. 13/886,535, 13 pages."
"569 OA Aug. 25, 2015Office Action, dated Aug. 25, 2015, regarding U.S. Appl. No. 13/769,569, 44 pages."
"569 FOA Dec. 30, 2016Final Office Action, dated Dec. 30, 2016, regarding U.S. Appl. No. 13/769,569, 19 pages."
"817 OA Nov. 28, 2014Office Action, dated Nov. 28, 2014, regarding U.S. Appl. No. 13/951,817, 17 pages."
"817 NOA Mar. 27, 2015Notice of Allowance, dated Mar. 27, 2015, regarding U.S. Appl. No. 13/951,817, 12 pages."
"846 OA May 11, 2015Office Action, dated May 11, 2015, regarding U.S. Appl. No. 14/016,846, 36 pages."
"846 FOA Sep. 1, 2015Final Office Action, dated Sep. 1, 2015, regarding U.S. Appl. No. 14/016,846, 10 pages."
European Patent Office Communication, dated Mar. 22, 2017, regarding USPTO Application No. 14180160.5, 4 pages.
Office Action, dated Sep. 21, 2017, regarding U.S. Appl. No. 13/769,569, 21 pages.
Final Office Action, dated Oct. 3, 2017, regarding U.S. Appl. No. 13/973,528, 30 pages.
Canadian Intellectual Property Office Office Action, dated Oct. 17, 2017, regarding Application No. 2,898,323, 15 pages.
State Intellectual Property Office of the PRC Notification of Second Office Action, dated Jul. 24, 2017, regarding Application No. 201480008306X, 49 pages.
State Intellectual Property Office of the PRC, Notification of First Office Action and English translation, dated Dec. 1, 2017, regarding Application No. 2014104087216, 26 pages.
State Intellectual Property Office of the PRC ,First Notification of Office Action and English translation, dated Jan. 2, 2018, regarding Application No. 201410443281.8, 9 pages.
State Intellectual Property Office of the PRC Notification of Third Office Action, dated Jan. 5, 2018, regarding Application No. 201480008306X, 50 pages.
Canadian Intellectual Property Office Examination Report, dated Feb. 12, 2018, regarding Application No. 2,855,480, 14 pages.
Japanese Patent Office Notice of Reasons for Rejection, dated Feb. 6, 2018, regarding Application No. 2015-558012, 24 pages.
Korean Intellectual property Office Notice of Office Action, dated Feb. 14, 2018, regarding Application No. 10-2014-0089520, 12 pages.
Office Action, dated Apr. 16, 2018, regarding U.S. Appl. No. 13/973,528, 42 pages.
Japanese Patent Office Notice of Reasons for Rejection and English translation, dated May 15, 2018, regarding Application No. 2014-167395, 10 pages.
Canadian Intellectual Property Office, Examination Search Report, dated Jul. 31, 2018, regarding Application No. 2898323, 19 pages.

\* cited by examiner

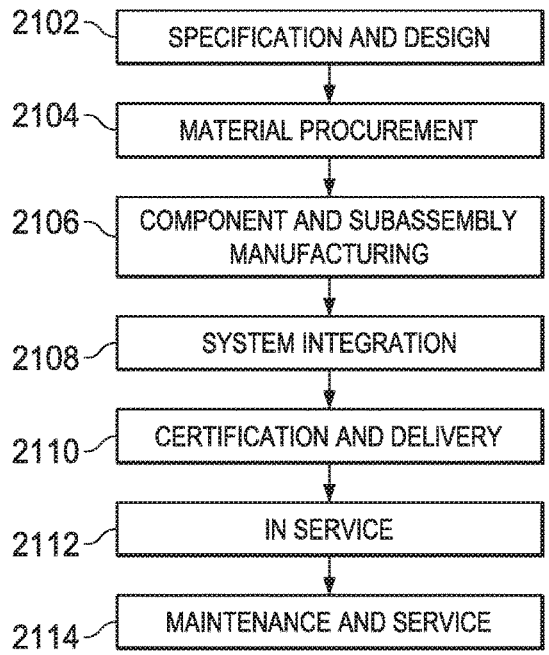
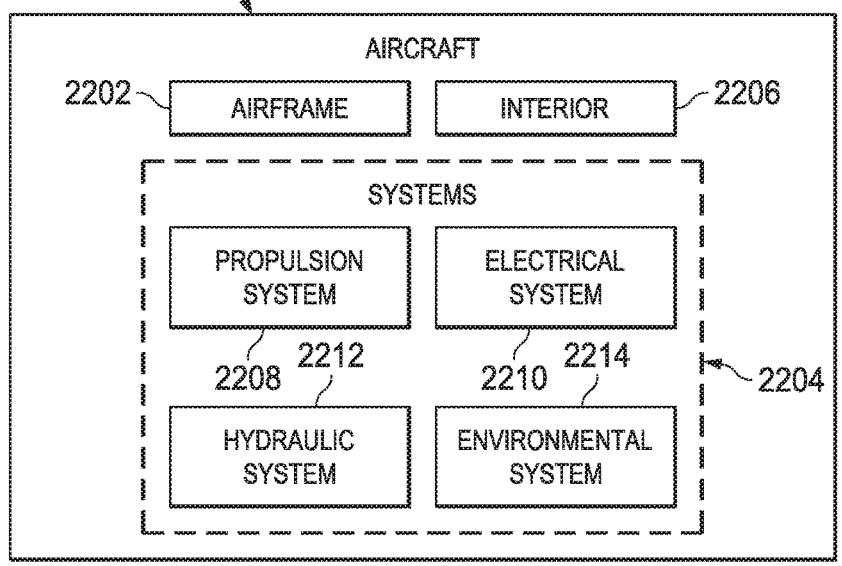

TOOL FOR APPLYING A FLUID ONTO A SURFACE

CROSS-REFERENCE TO RELATED APPLICATION

This application is a division of and claims the benefit of priority to U.S. patent application Ser. No. 14/016,846, filed Sep. 3, 2013, entitled "Tool for Applying a Fluid onto a Surface", the entire contents of which are incorporated herein by reference.

BACKGROUND INFORMATION

1. Field

The present disclosure relates generally to the application of fluids and, in particular, to a tool for use in applying a fluid onto a number of surfaces. Still more particularly, the present disclosure relates to a tool that can be attached to a robotic end effector for use in applying a fluid onto a number of surfaces with a desired level of precision.

2. Background

Some manufacturing and assembly operations may require that a high-viscosity fluid be applied onto various objects. As one illustrative example, certain assembly operations may require that a coat of sealant material be applied over the exposed ends of installed fasteners. The coat of sealant material may need to be applied in a manner that completely covers the exposed ends of the fasteners and the surfaces around the fastener.

Oftentimes, manual tools are used to apply high-viscosity fluids, such as, for example, but not limited to, sealant materials, onto surfaces. An example of one of these tools is a brush that has a handle with bristles that are attached to the handle.

For example, without limitation, a brush may be used to brush a coat of sealant material over an exposed end of a fastener element installed in an object and over a portion of the surface of the object surrounding the exposed end of the fastener element. A human operator, such as a qualified sealer, may dip the bristles of the brush into a container of sealant material and then use the bristles to brush the sealant material over the fastener element.

When sealant material is to be applied over hundreds of fasteners, the human operator may need to frequently re-dip the bristles of the brush into the container of sealant material. This type of manual application of sealant material may be more time-consuming and require more effort than desired.

Further, applying sealant material with precision using the process described above may be more difficult than desired. For example, when using a brush to apply sealant material over a fastener that has been installed in an object, ensuring that the sealant material completely covers all sides of the exposed end of the fastener as well as the surface around the fastener may require many more brush strokes than desired. In some cases, the brush may need to be angled relative to the fastener to cover all sides of the fastener with the sealant material.

This type of manual application of sealant material may be more tiring for the human operator than desired. Therefore, it would be desirable to have a method and apparatus that take into account at least some of the issues discussed above, as well as other possible issues.

SUMMARY

In one illustrative example, an apparatus may comprises a base having a number of channels, a number of flexible members extending from the base, and an applicator extending from the base on a same side as the number of flexible members. A flexible member in the number of flexible members may have a fluid channel connected to at least one of the number of channels in the base to allow a fluid flowing through the number of channels to flow out of the fluid channel. The applicator may be configured to apply the fluid flowing out of the number of flexible members onto a number of surfaces.

In another illustrative embodiment, a tool may comprise a base having a number of channels, a number of flexible members extending from the base, and a plurality of bristles extending from the base on a same side as the number of flexible members. A flexible member in the number of flexible members may have a fluid channel connected to at least one of the number of channels in the base to allow a fluid flowing through the number of channels to flow out of the fluid channel. The plurality of bristles may be configured to apply the fluid flowing out of the number of flexible members onto a number of surfaces. Lengths of bristles in the plurality of bristles and angles of the bristles in the plurality of bristles relative to the base may be varied such that the fluid may be applied onto the number of surfaces by ends of the plurality of bristles.

In yet another illustrative embodiment, a method for applying a fluid onto a number of surfaces is provided. The fluid may be received within a number of fluid channels of a number of flexible members extending from a base. The fluid may be moved out of the number of fluid channels. The fluid may be applied onto the number of surfaces using an applicator extending from the base on a same side as the number of flexible members.

In still another illustrative embodiment, a method for applying a fluid onto a number of surfaces is provided. The fluid may be dispensed from an exit of a dispensing device into a channel of a connector extending from a base of a tool. The fluid from the channel may be moved into a number of channels in the base. The fluid may be moved from the number of channels in the base into a number of fluid channels of a number of flexible members extending from the base of the tool on a side of the base opposite the connector. The fluid may be moved out of the number of fluid channels. The fluid may be applied onto the number of surfaces using a plurality of bristles extending from the base on a same side as the number of flexible members. Lengths of bristles in the plurality of bristles and angles of the bristles in the plurality of bristles relative to the base may be varied such that the fluid may be applied onto the number of surfaces by ends of the plurality of bristles.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 21 is illustration of an aircraft manufacturing and service method in the form of a flowchart in accordance with an illustrative embodiment; and FIG. 22 is an illustration of an aircraft in the form of a block diagram in accordance with an illustrative embodiment.

DETAILED DESCRIPTION

The illustrative embodiments recognize and take into account different considerations. For example, without limitation, the illustrative embodiments recognize and take into account that it may be desirable to have a tool that reduces the amount of time needed for applying sealant material, while simultaneously improving the ergonomics of using the tool and the quality of the application of the sealant material. Further, the illustrative embodiments recognize and take into account that attaching the tool to a robotic end effector configured to dispense sealant material may reduce the time needed for sealant application and improve the precision with which the sealant material may be applied.

Thus, the illustrative embodiments provide a tool for applying sealant material onto one or more surfaces. In one illustrative embodiment, an apparatus may comprises a base having a number of channels, a number of flexible members extending from the base, and an applicator extending from the base on a same side as the number of flexible members. A flexible member in the number of flexible members may have a fluid channel connected to at least one of the number of channels in the base to allow a fluid flowing through the number of channels to flow out of the fluid channel. The applicator may be configured to apply the fluid flowing out of the number of flexible members onto a number of surfaces.

Figure 1:
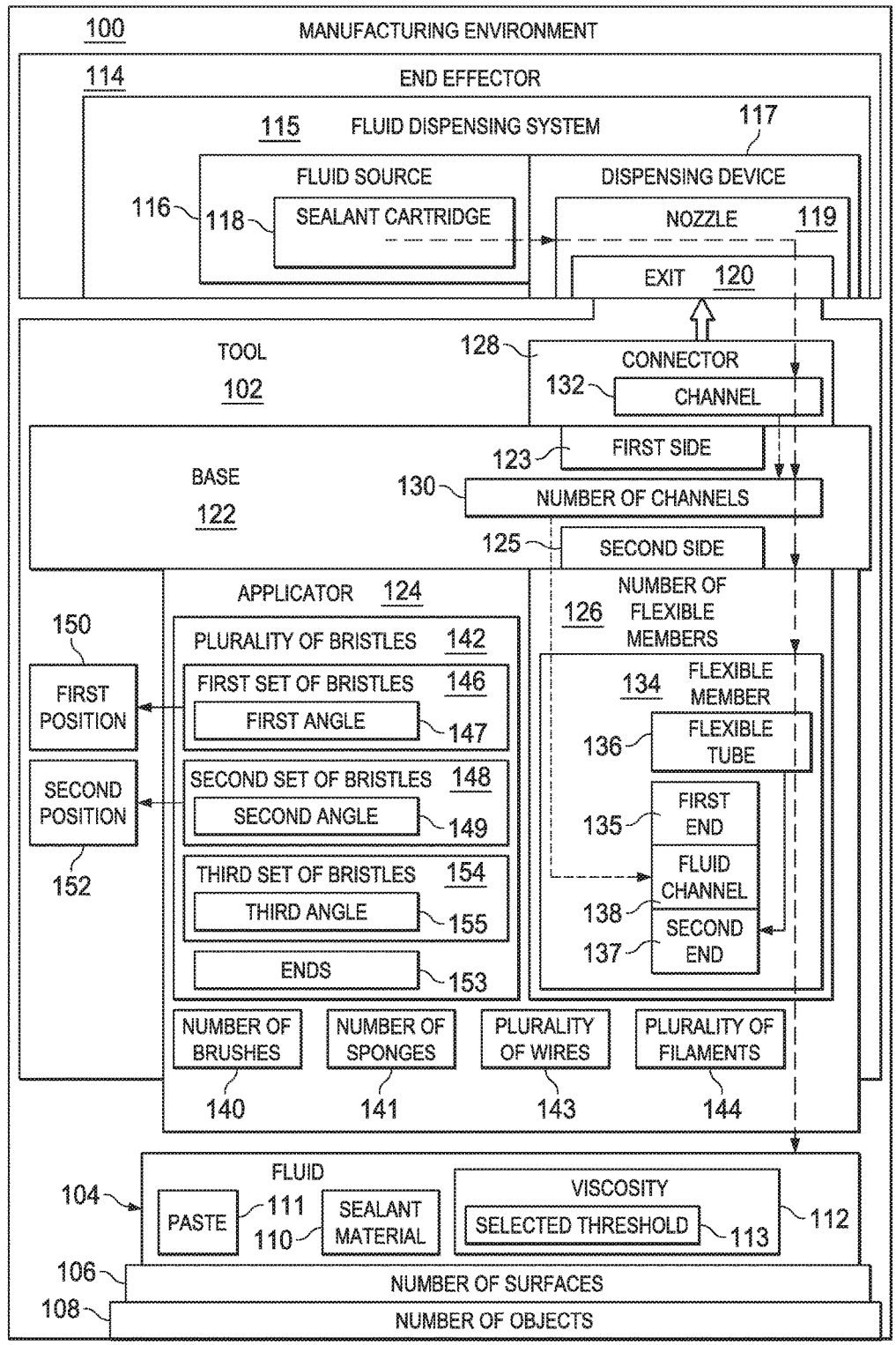
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. In this illustrative example, manufacturing environment 100 may be an example of an environment in which tool 102 may be used to apply fluid 104 onto number of surfaces 106 of number of objects 108.

As used herein, a "number of" items may mean one or more items. In this manner, number of surfaces 106 may include one or more surfaces. Similarly, number of objects 108 may include one or more objects.

In one illustrative example, number of objects 108 may include a fastener element and an object in which the fastener element is installed. Number of surfaces 106 may include the surface of the exposed portion of the fastener element and the surface of the object around the fastener element.

Fluid 104 may take a number of different forms. Depending on the implementation, fluid 104 may take the form of sealant material 110, paste 111, or some other type of fluid. In this illustrative example, fluid 104 may have viscosity 112 greater than selected threshold 113. Selected threshold 113 may be, for example, without limitation, about 500 centipoise.

Fluid 104 may be dispensed to tool 102 from end effector 114. End effector 114 may be a device or system configured for attachment to, for example, without limitation, a robotic device. The robotic device may be a robotic arm in some cases. In this manner, end effector 114 may be referred to as a robotic end effector.

In this illustrative example, end effector 114 may take the form of fluid dispensing system 115. Fluid dispensing system 115 may include fluid source 116 and dispensing device 117. In some cases, fluid source 116 may be removably attached to fluid dispensing system 115. Fluid source 116 may be configured to hold fluid 104. For example, when fluid 104 takes the form of sealant material 110, fluid source 116 may be sealant cartridge 118 configured to hold sealant material 110.

Dispensing device 117 may receive fluid 104 from fluid source 116. Dispensing device 117 may be configured to dispense fluid 104 out of exit 120 of dispensing device 117. In one illustrative example, dispensing device 117 may include nozzle 119 having exit 120. Exit 120 may be an opening in nozzle 119 through which fluid 104 leaves dispensing device 117. In other illustrative examples, dispensing device 117 may include a valve system for controlling the flow of fluid 104 out of dispensing device 117 to tool 102.

In this illustrative example, tool 102 may include base 122, applicator 124, number of flexible members 126, and connector 128. Base 122 may have first side 123 and second side 125. First side 123 and second side 125 may be opposite sides of base 122. Further, base 122 may have number of channels 130 that extend from first side 123 to second side 125. Connector 128 may be associated with base 122 at first side 123 of base 122. As used herein, when one component is "associated" with another component, the association is a physical association in the depicted examples.

For example, without limitation, a first component, such as connector 128, may be considered to be associated with a second component, such as base 122, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Connector 128 may be used to connect, or attach, tool 102 to fluid dispensing system 115. As depicted, connector 128 may have channel 132. Connector 128 may be connected to dispensing device 117 of fluid dispensing system 115 in a manner such that fluid 104 flowing out of exit 120 of dispensing device 117 flows into channel 132 of connector 128. In this manner, connector 128 may be attached to fluid dispensing system 115 to fluidly connect dispensing device 117 to connector 128. As a result, exit 120 of dispensing device 117 may be fluidly connected to channel 132 of connector 128.

Further, connector 128 may be associated with first side 123 of base 122 such that connector 128 is fluidly connected to base 122. In particular, fluid 104 flowing through channel 132 of connector 128 may flow into number of channels 130 of base 122. Channel 132 of connector 128 may be fluidly connected to number of channels 130 of base 122.

Applicator 124 and number of flexible members 126 may extend from a same side of base 122, which may be second side 125 in this illustrative example. As used herein, a "flexible member," such as one of number of flexible members 126 may be a structure comprised of any number of materials that allow the structure to have some flexibility.

Flexible member 134 is an example of one of number of flexible members 126. Flexible member 134 may take the form of flexible tube 136 in one illustrative example. First end 135 of flexible member 134 may be associated with second side 125 of base 122, while second end 137 of flexible member 134 may be exposed and located some distance away from base 122. In this illustrative example, second end 137 may be an open end.

For example, without limitation, flexible member 134 may be a hollow member having fluid channel 138 that extends from first end 135 to second end 137. Fluid channel 138 may be connected to at least one of number of channels 130 of base 122 to allow fluid 104 flowing through number of channels 130 to flow through fluid channel 138 and out of fluid channel 138 at second end 137. Fluid channel 138 may be fluidly connected to at least one of number of channels 130. In this illustrative example, second end 137 of fluid channel 138 may not extend past the furthest tip of applicator 124.

Applicator 124 may be used to apply fluid 104 that flows out of fluid channel 138 onto at least one of number of surfaces 106. Further, applicator 124 may be used to apply fluid 104 that flows out of the fluid channel of each of number of flexible members 126 onto number of surfaces 106.

In particular, applicator 124 may be moved over number of surfaces 106 in a manner that transfers at least a portion of fluid 104 flowing out of number of flexible members 126 onto number of surfaces 106. For example, without limitation, tool 102 may be rotated such that applicator 124 is rotated over number of surfaces 106. In another example, applicator 124 may be moved in a sweeping motion over number of surfaces 106.

Applicator 124 may be implemented in a number of different ways. For example, without limitation, applicator 124 may comprise at least one of number of brushes 140, number of sponges 141, plurality of bristles 142, plurality of wires 143, plurality of filaments 144, or some other type of element or group of elements configured for use in applying fluid 104 onto a surface.

In one illustrative example, applicator 124 may comprise plurality of bristles 142. In some illustrative examples, at least a portion of plurality of bristles 142 may be angled relative to base 122 at an angle different from other bristles in plurality of bristles 142. By angling the bristles in plurality of bristles 142 at different angles, plurality of bristles 142 may be able to apply fluid 104 onto surfaces having various shapes and/or geometries.

In another illustrative example, plurality of bristles 142 may include first set of bristles 146 and second set of bristles 148. First set of bristles 146 may be configured to extend to first position 150 located a first distance away from base 122. Second set of bristles 148 may be configured to extend to second position 152 located a second distance away from base 122. First position 150 may be different from base 122. In this manner, first set of bristles 146 may be used to apply fluid 104 onto two different types of surfaces at the same time.

In yet another illustrative example, plurality of bristles 142 may include first set of bristles 146, second set of bristles 148, and third set of bristles 154. First set of bristles 146, second set of bristles 148, and third set of bristles 154 may be configured to apply fluid 104 onto a first surface, a second surface, and a third surface, respectively, in number of surfaces 106.

In one illustrative example, first set of bristles 146, second set of bristles 148, and third set of bristles 154 may extend from base 122 at first angle 147, second angle 149, and third angle 155, respectively. First angle 147, second angle 149, and third angle 155 may all be different angles in this illustrative example. Further, first angle 147, second angle 149, and third angle 155 may be selected for first set of bristles 146, second set of bristles 148, and third set of bristles 154, respectively, based on the particular surface with which the set of bristles is to be used.

For example, without limitation, first angle 147 for first set of bristles 146 may be selected such that the ends, or tips, of first set of bristles 146 contact a particular surface rather than the sides of first set of bristles 146. In this manner, fluid 104 may be applied to this surface evenly and adequately.

When the sides of plurality of bristles 142 touch a surface as opposed to ends 153 of plurality of bristles 142, good agitation of plurality of bristles 142 and coverage by plurality of bristles 142 may not be achieved. Ends 153 of plurality of bristles 142 may also be referred to as the tips of plurality of bristles 142. Consequently, first set of bristles 146, second set of bristles 148, and third set of bristles 154 may be angled relative to base 122 based on the surfaces to be contacted by these sets of bristles.

Further, the lengths of the bristles in plurality of bristles 142 may be varied based on the angles of the bristles in plurality of bristles 142 relative to base 122 to ensure that ends 153 of plurality of bristles 142 contact number of surfaces 106. In particular, the lengths of plurality of bristles 142 and the angles of plurality of bristles 142 relative to base 122 may be varied such that fluid 104 is applied onto number of surfaces 106 by ends 153 of plurality of bristles 142.

The illustration of manufacturing environment 100 and tool 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, each bristle in plurality of bristles 142 may extend from base 122 at a different angle relative to the other bristles in plurality of bristles 142. In this manner, different types of surfaces may be evenly and adequately coated with fluid 104 using plurality of bristles 142.

Figure 2:
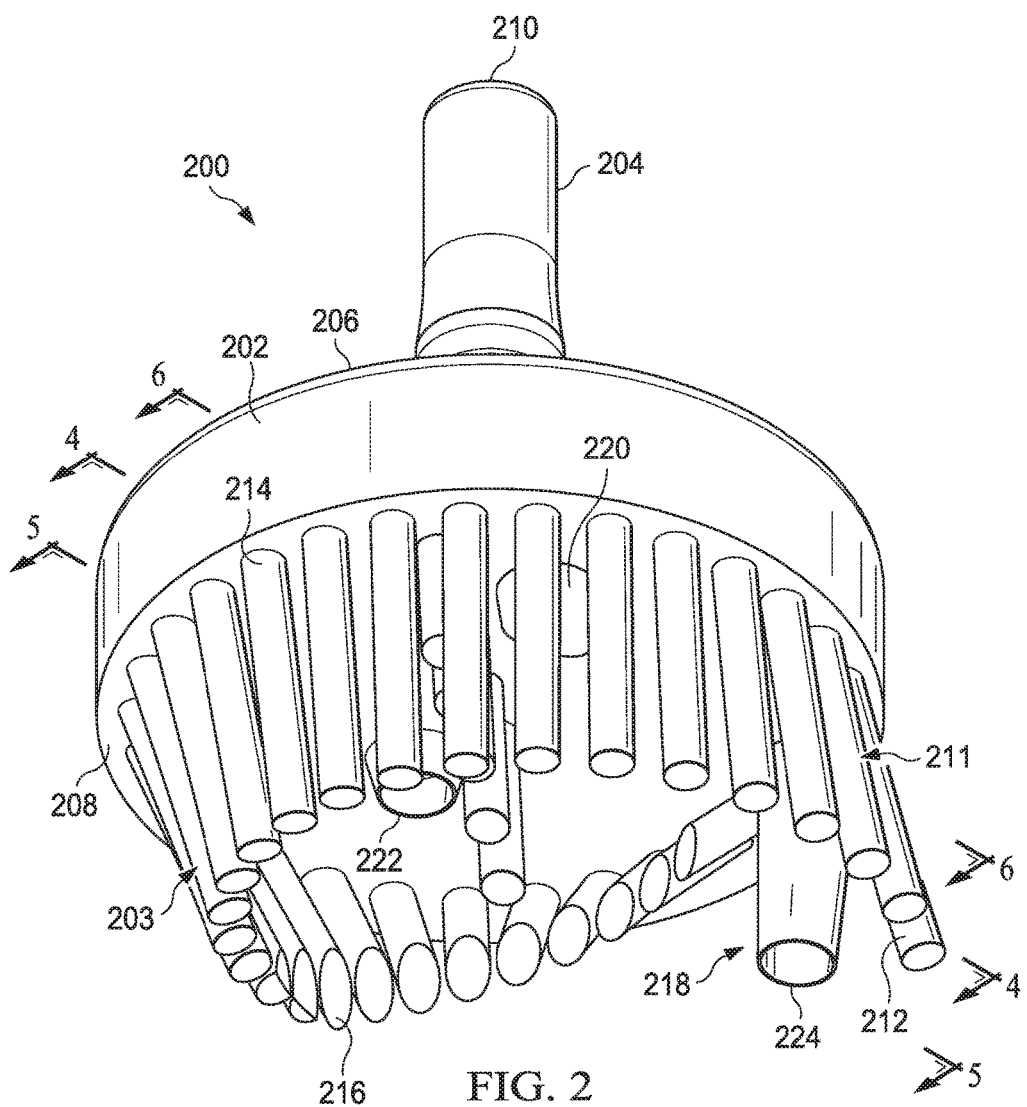
FIG. 2 is an illustration of a bottom isometric view of a tool in accordance with an illustrative embodiment.

With reference now to FIG. 2, an illustration of a bottom isometric view of a tool is depicted in accordance with an illustrative embodiment. In this illustrative example, tool 200 may be an example of one implementation for tool 102 in FIG. 1. As depicted, tool 200 may include base 202, applicator 203, and connector 204. Base 202, applicator 203, and connector 204 may be examples of implementations for base 122, applicator 124, and connector 128, respectively, in FIG. 1.

In this illustrative example, base 202 may have first side 206 and second side 208. Connector 204 may be associated with and extend from first side 206 of base 202. End 210 of connector 204 may be used to connect tool 200 to an end effector (not shown), such as end effector 114 in FIG. 1.

Applicator 203 may be associated with and extend from second side 208 of base 202. In this illustrative example, applicator 203 may comprise plurality of bristles 211. Plurality of bristles 211 may be an example of one implementation for plurality of bristles 142 in FIG. 1.

In this illustrative example, plurality of bristles 211 may include bristles that are angled at different angles relative to base 202. For example, bristle 212, bristle 214, and bristle 216 may all be angled at different angles relative to base 202. Plurality of bristles 211 may be angled relative to base 202 such that the exposed ends, or tips, of plurality of bristles 211 may contact the surfaces selected for fluid application rather than the sides of plurality of bristles 211.

As depicted, plurality of bristles 211 may include bristles of varying lengths. The varying lengths of the bristles in plurality of bristles 211 and the varying angles of the bristles in plurality of bristles 211 relative to base 202 may ensure that fluid is applied evenly and with adequate coverage over selected surfaces.

In this illustrative example, tool 200 may also include number of flexible tubes 218. Number of flexible tubes 218 may be an example of one implementation for number of flexible members 126 in FIG. 1. Number of flexible tubes 218 may include flexible tubes 220, 222, and 224. As depicted, the exposed ends of these flexible tubes may not extend past the furthest tip of plurality of bristles 211 of applicator 203.

Figure 3:
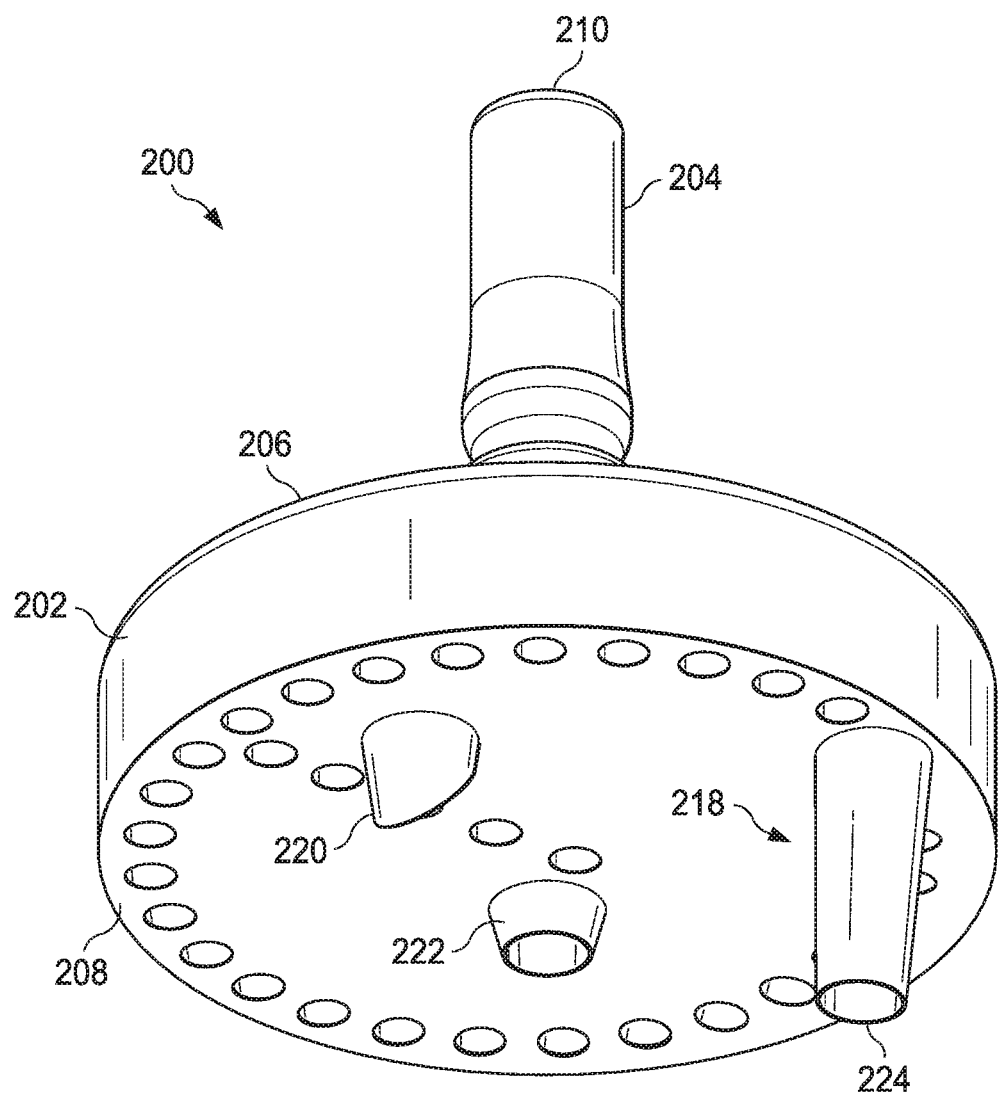
FIG. 3 is an illustration of a bottom isometric view of a tool in accordance with an illustrative embodiment.

With reference now to FIG. 3, an illustration of a bottom isometric view of tool 200 from FIG. 2 is depicted in accordance with an illustrative embodiment. Applicator 203 with plurality of bristles 211 from FIG. 2 is not shown in this view such that number of flexible tubes 218 may be more clearly seen. In this illustrative example, each of flexible tubes 220, 222, and 224 extends to a different position away from base 202.

Figure 4:
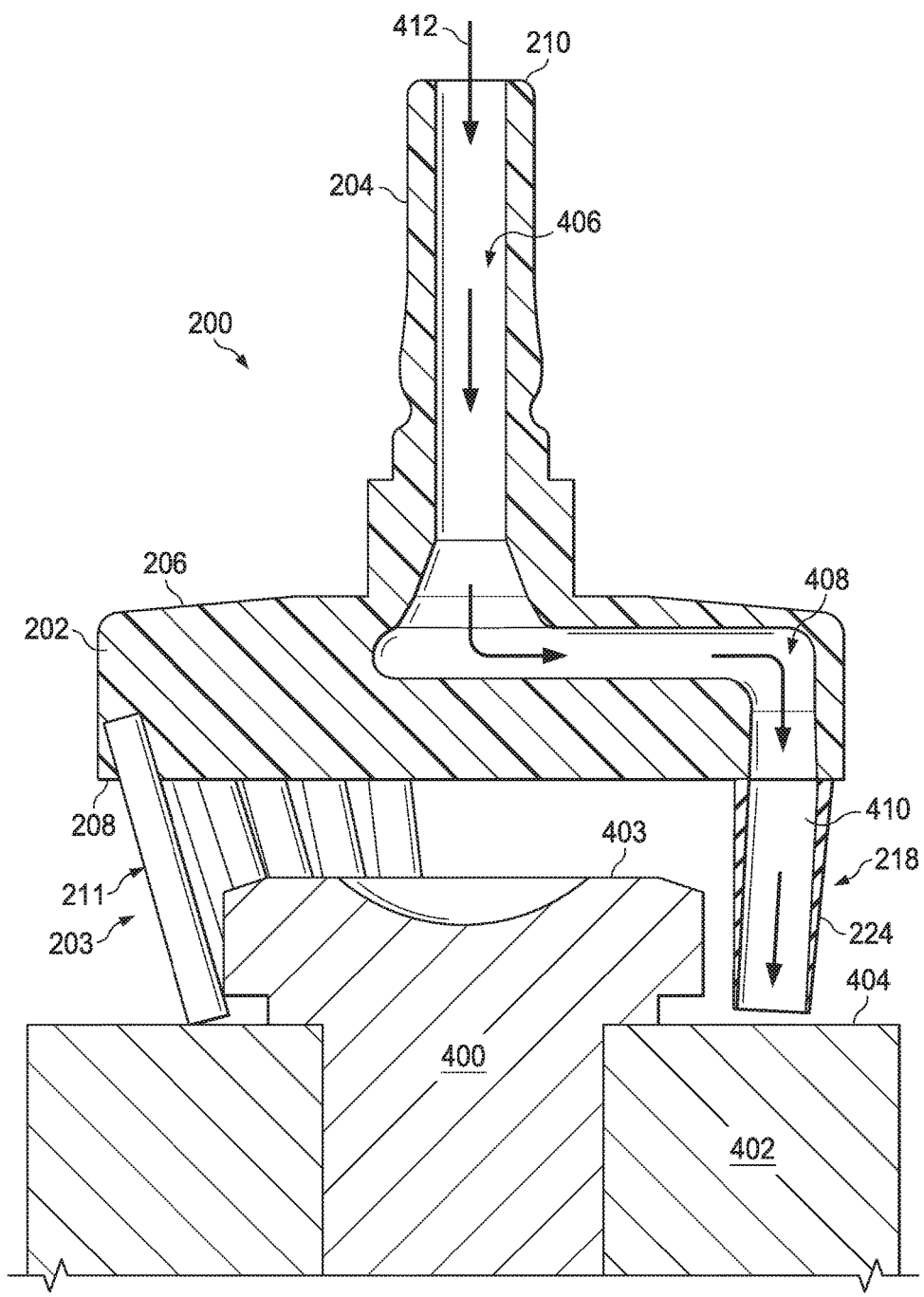
FIG. 4 is an illustration of a cross-sectional view of a tool in accordance with an illustrative embodiment.

Turning now to FIG. 4, an illustration of a cross-sectional view of tool 200 from FIG. 2 is depicted in accordance with an illustrative embodiment. In this illustrative example, a cross-sectional view of tool 200 from FIG. 2 is depicted taken along lines 4-4.

Tool 200 may be used to apply a fluid, such as fluid 104 in FIG. 1, over fastener element 400 installed in object 402. Fastener element 400 may have head 403 exposed at surface 404 of object 402. Tool 200 may also be used to apply the fluid over the portion of surface 404 around head 403.

As depicted, connector 204 may have channel 406, an example of one implementation for channel 132 in FIG. 1. Further, base 202 may have channel 408, an example of one implementation for a channel in number of channels 130 of base 122 in FIG. 1.

The cross-sectional view of tool 200 is depicted such that only flexible tube 224 of number of flexible tubes 218 from FIG. 2 may be seen. In this illustrative example, flexible tube 224 may have fluid channel 410, an example of one implementation for fluid channel 138 in FIG. 1. A fluid may flow in the direction of arrow 412 through channel 406, into and through channel 408, and into and out of fluid channel 410. Applicator 203 may be rotated such that fluid flowing out of fluid channel 410 may be applied over surface 404 of object 402 by applicator 203 as applicator 203 rotates.

Figure 5:
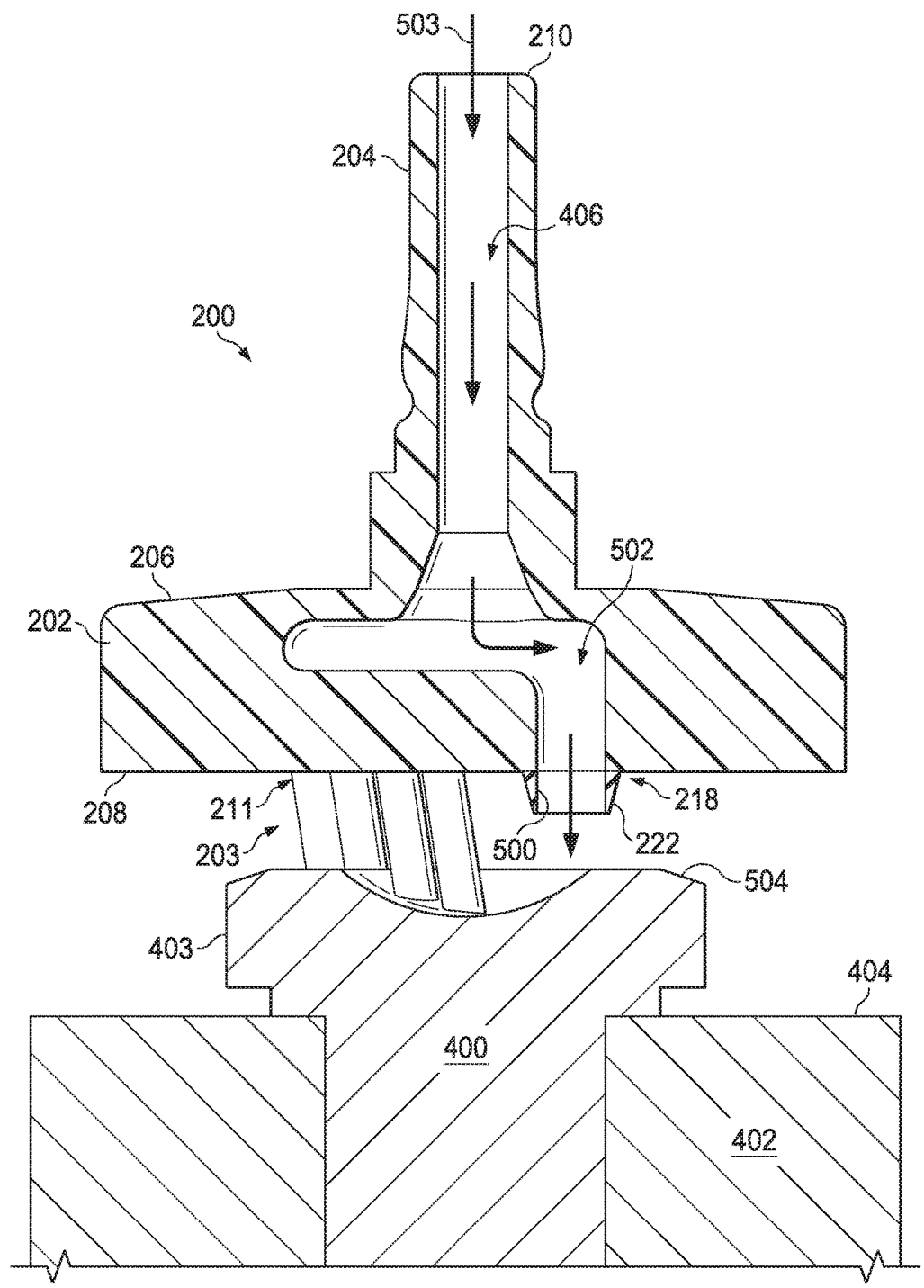
FIG. 5 is an illustration of another cross-sectional view of a tool in accordance with an illustrative embodiment.

Turning now to FIG. 5, an illustration of another cross-sectional view of tool 200 from FIG. 2 is depicted in accordance with an illustrative embodiment. In this illustrative example, a cross-sectional view of tool 200 from FIG. 2 is depicted taken along lines 5-5.

In this illustrative example, the cross-sectional view of tool 200 is depicted such that only flexible tube 222 of number of flexible tubes 218 from FIG. 2 may be seen. In this illustrative example, flexible tube 222 may have fluid channel 500, an example of one implementation for fluid channel 138 in FIG. 1. Further, base 202 may have channel 502, an example of one implementation for a channel in number of channels 130 in FIG. 1.

A fluid may flow in the direction of arrow 503 through channel 406, into and through channel 502, and into and out of fluid channel 500. Applicator 203 may be rotated such that fluid flowing out of fluid channel 500 may be applied over top surface 504 of head 403 of fastener element 400 by applicator 203 as applicator 203 rotates.

Figure 6:
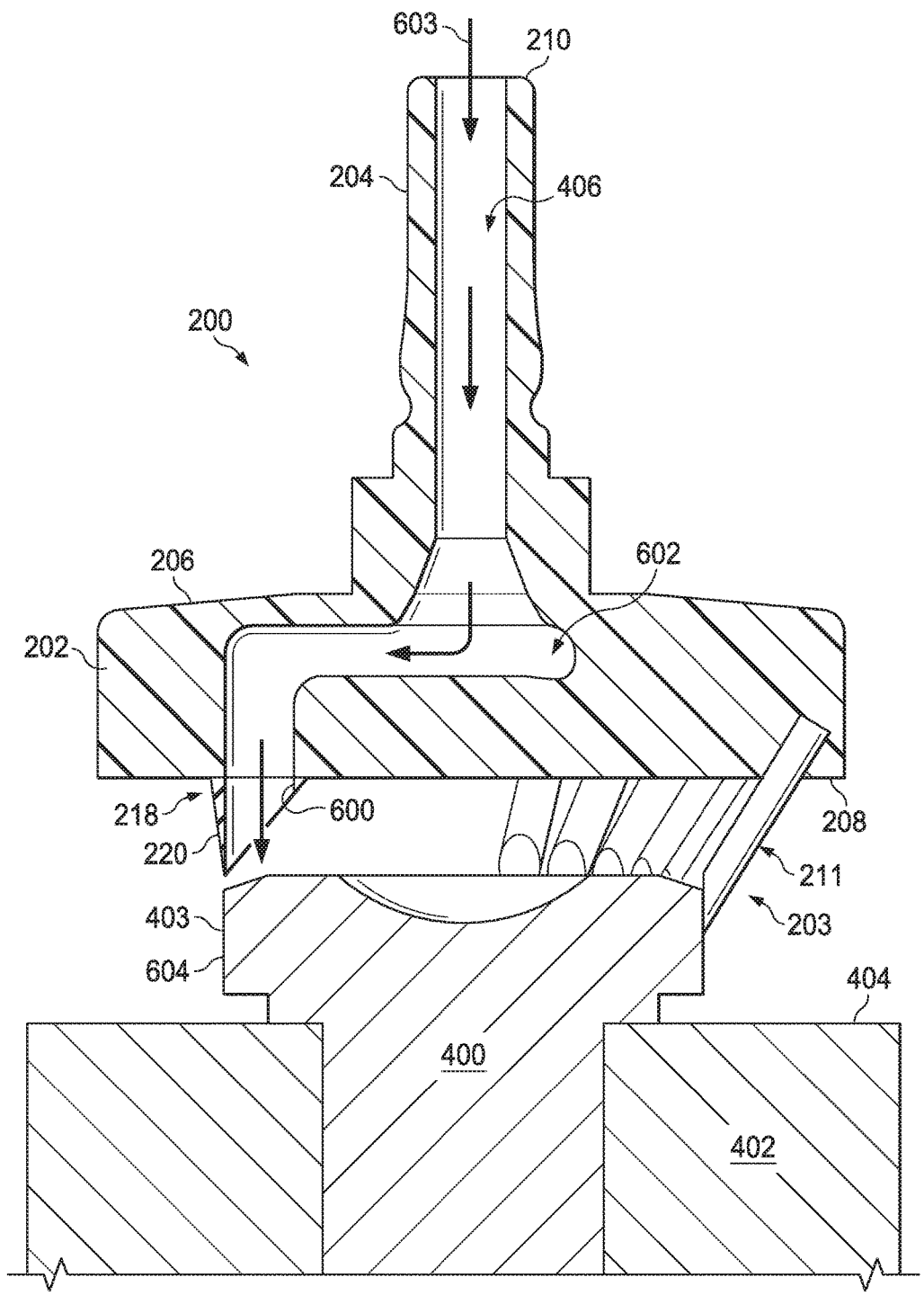
FIG. 6 is an illustration of yet another cross-sectional view of a tool in accordance with an illustrative embodiment.

Turning now to FIG. 6, an illustration of yet another cross-sectional view of tool 200 from FIG. 2 is depicted in accordance with an illustrative embodiment. In this illustrative example, a cross-sectional view of tool 200 from FIG. 2 is depicted taken along lines 6-6.

In this illustrative example, the cross-sectional view of tool 200 is depicted such that only flexible tube 220 of number of flexible tubes 218 from FIG. 2 may be seen. In this illustrative example, flexible tube 220 may have fluid channel 600, an example of one implementation for fluid channel 138 in FIG. 1. Further, base 202 may have channel 602, an example of one implementation for a channel in number of channels 130 in FIG. 1.

A fluid may flow in the direction of arrow 603 through channel 406, into and through channel 602, and into and out of fluid channel 600. Applicator 203 may be rotated such that fluid flowing out of fluid channel 600 may be applied over side surface 604 of head 403 of fastener element 400 by applicator 203 as applicator 203 rotates.

Figure 7:
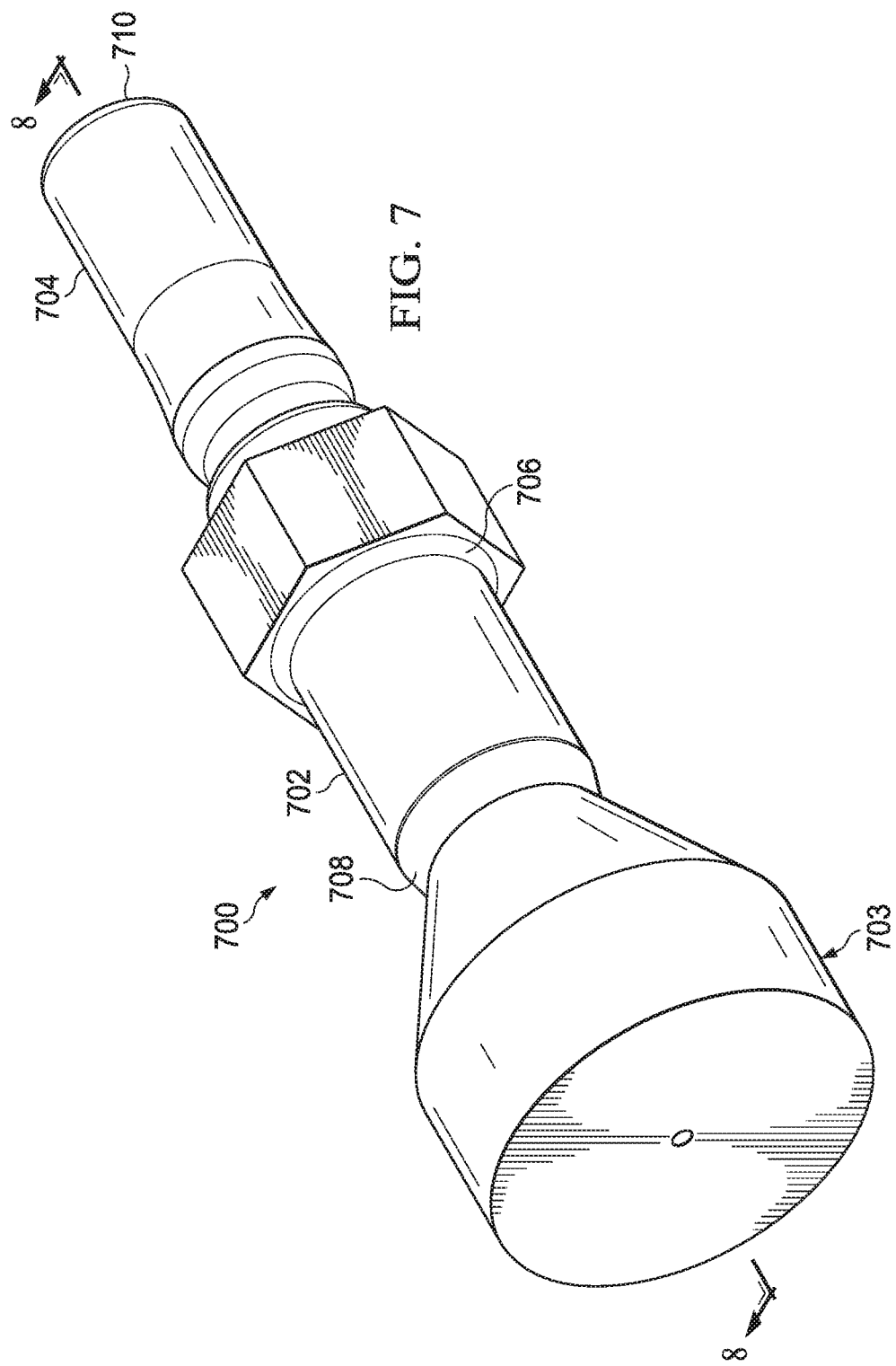
FIG. 7 is in an illustration of a different type of tool accordance with an illustrative embodiment.

With reference now to FIG. 7, an illustration of a different type of tool is depicted in accordance with an illustrative embodiment. In this illustrative example, tool 700 may be an example of one implementation for tool 102 in FIG. 1. As depicted, tool 700 may include base 702, connector 704, and applicator 703. Base 702, applicator 703, and connector 704 may be examples of implementations for base 122, applicator 124, and connector 128, respectively, in FIG. 1.

In this illustrative example, base 702 may have first side 706 and second side 708. Connector 704 may be associated with and extend from first side 706 of base 702. End 710 of connector 704 may be used to connect tool 700 to an end effector (not shown), such as end effector 114 in FIG. 1.

Applicator 703 may be associated with and extend from second side 708 of base 702. In this illustrative example, applicator 703 may be implemented using a plurality of bristles (not individually shown in this figure).

Figure 8:
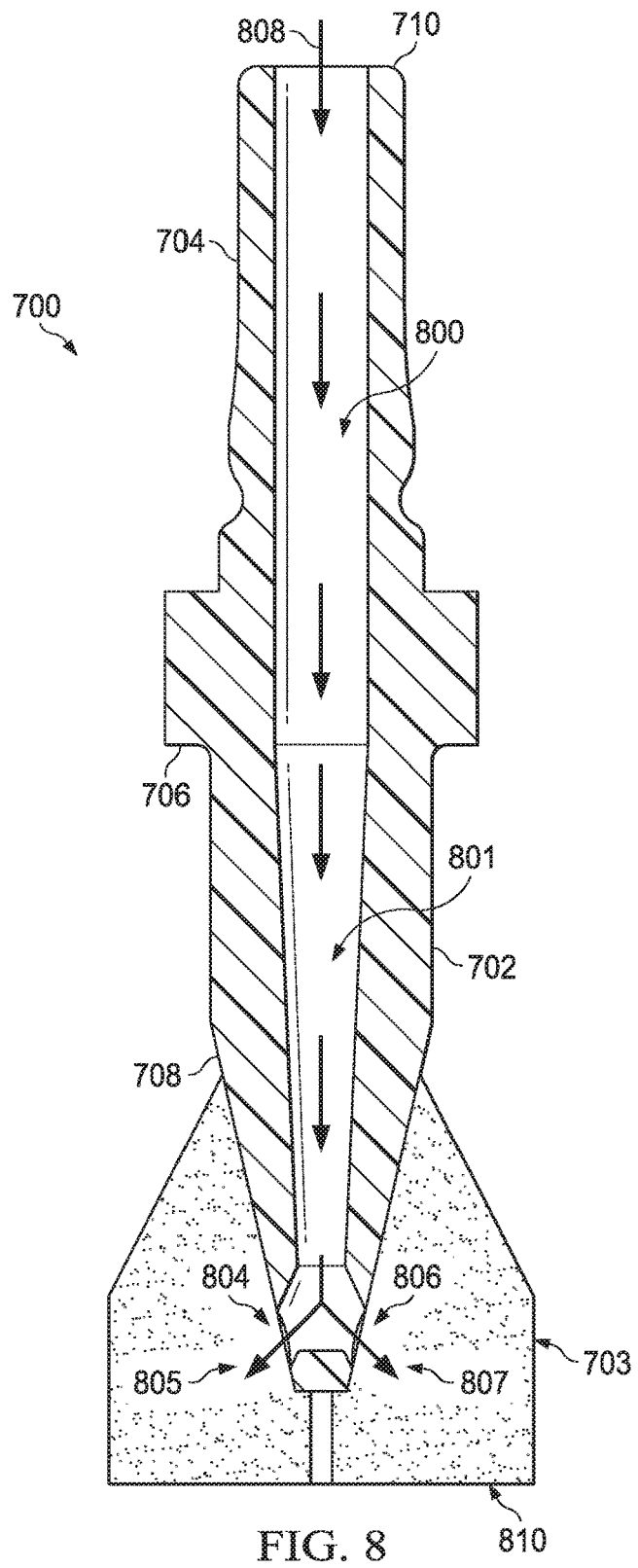
FIG. 8 is an illustration of a cross-sectional view of a tool in accordance with an illustrative embodiment.

Turning now to FIG. 8, an illustration of a cross-sectional view of tool 700 from FIG. 7 is depicted in accordance with an illustrative embodiment. In this illustrative example, a cross-sectional view of tool 700 from FIG. 7 is depicted taken along lines 8-8 in FIG. 7.

In FIG. 8, channel 800 of connector 704 may be seen. Channel 800 may be an example of one implementation for channel 132 in FIG. 1. Further, channel 801 in base 702 may be seen. Channel 801 may be an example of one implementation for number of channels 130 in FIG. 1.

Tool 700 may also include flexible tube 804 and flexible tube 806, an example of one implementation for flexible tube 136 in FIG. 1. Flexible tube 804 and flexible tube 806 may have fluid channel 805 and fluid channel 807, respectively.

In this illustrative example, a fluid (not shown) may flow in the direction of arrow 808 through channel 800 of connector 704, into and through channel 801 of base 702, and into and out of fluid channel 805 and fluid channel 807.

In this illustrative example, flexible tube 804 and flexible tube 806 may not extend past applicator 703. The bristles (not shown) that form applicator 703 may all extend to a same position 810 away from base 702.

Figure 9:
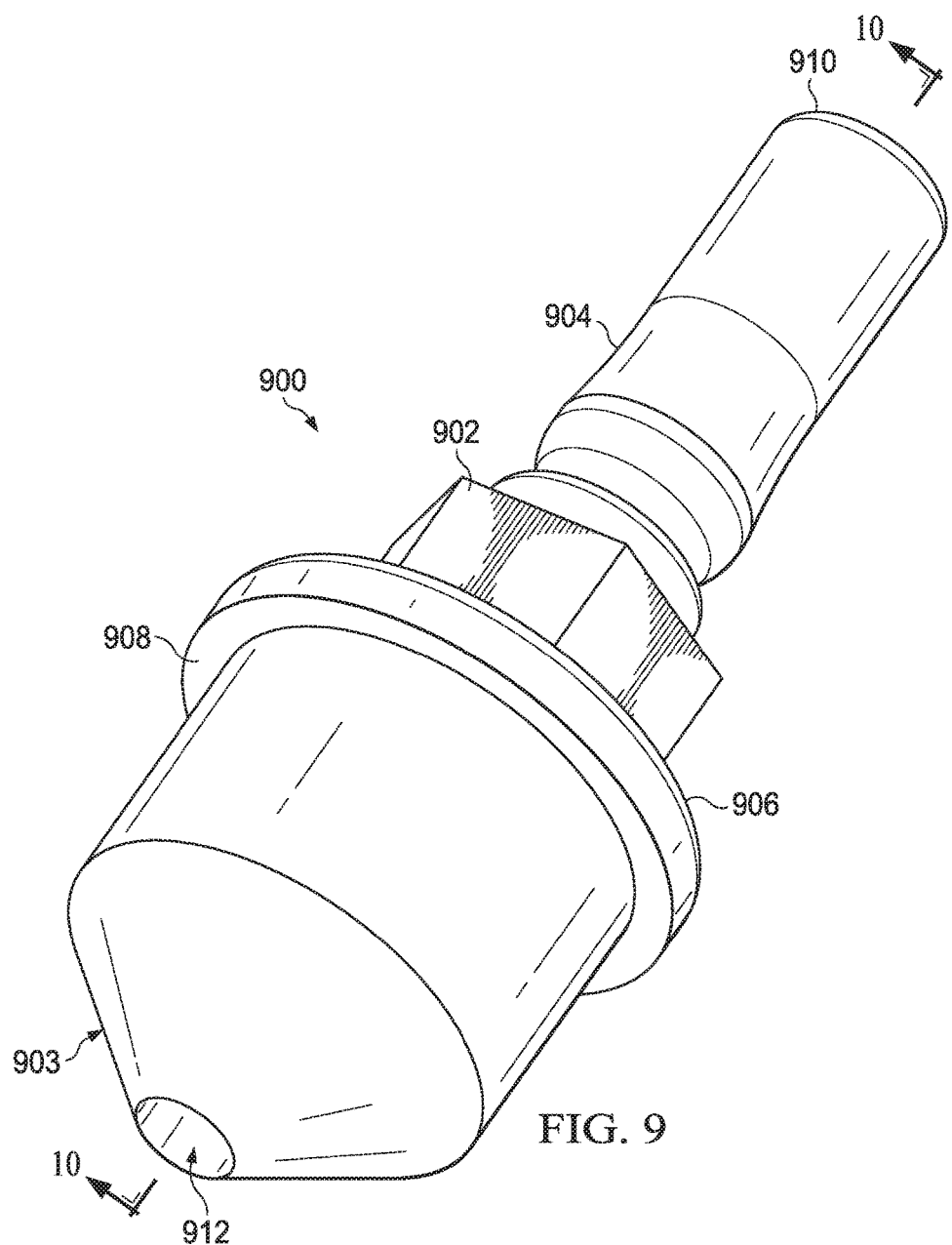
FIG. 9 is an illustration of another type of tool in accordance with an illustrative embodiment.

With reference now to FIG. 9, an illustration of another type of tool is depicted in accordance with an illustrative embodiment. In this illustrative example, tool 900 may be an example of one implementation for tool 102 in FIG. 1. As depicted, tool 900 may include base 902, connector 904, and applicator 903. Base 902, applicator 903, and connector 904 may be examples of implementations for base 122, applicator 124, and connector 128, respectively, in FIG. 1.

In this illustrative example, base 902 may have first side 906 and second side 908. Connector 904 may be associated with and extend from first side 906 of base 902. End 910 of connector 904 may be used to connect tool 900 to an end effector (not shown), such as end effector 114 in FIG. 1.

Applicator 903 may be associated with and extend from second side 908 of base 902. In this illustrative example, applicator 903 may be implemented using a plurality of bristles (not individually shown in this figure). Applicator 903 may have opening 912 through applicator 903.

Figure 10:
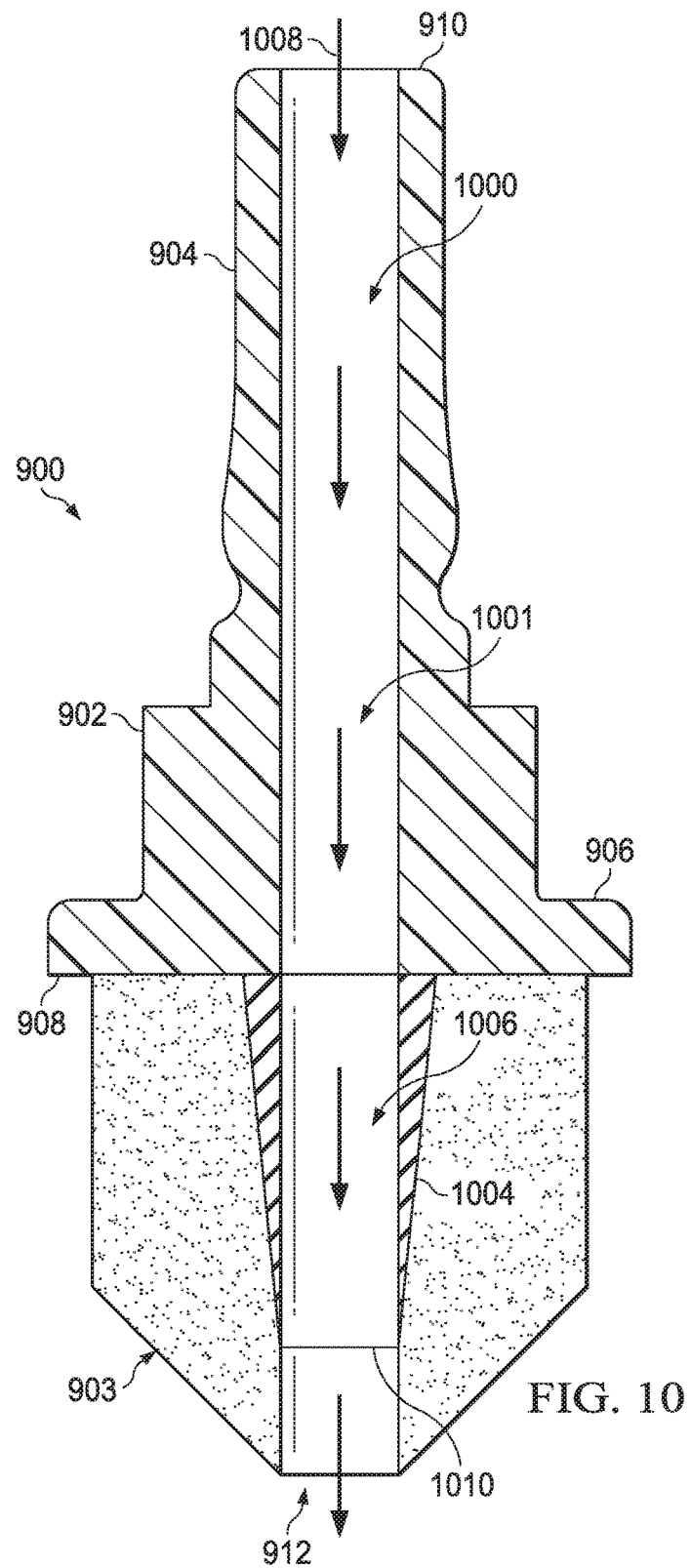
FIG. 10 is an illustration of a cross-sectional view of a tool in accordance with an illustrative embodiment.

Turning now to FIG. 10, an illustration of a cross-sectional view of tool 900 from FIG. 9 is depicted in accordance with an illustrative embodiment. In this illustrative example, a cross-sectional view of tool 900 from FIG. 9 is depicted taken along lines 10-10 in FIG. 9.

In FIG. 10, channel 1000 of connector 904 may be seen. Channel 1000 may be an example of one implementation for channel 132 in FIG. 1. Further, channel 1001 in base 902 may be seen. Channel 1001 may be an example of one implementation for number of channels 130 in FIG. 1.

Tool 900 may also include flexible tube 1004, an example of one implementation for flexible tube 136 in FIG. 1. Flexible tube 1004 may have fluid channel 1006.

In this illustrative example, a fluid (not shown) may flow in the direction of arrow 1008 through channel 1000 of connector 904, into and through channel 1001 of base 902, and into and out of fluid channel 1006.

In this illustrative example, flexible tube 1004 may have end 1010 that does not extend past applicator 903. The bristles (not shown) that form applicator 903 may extend to different positions away from base 922, as depicted.

Figure 11:
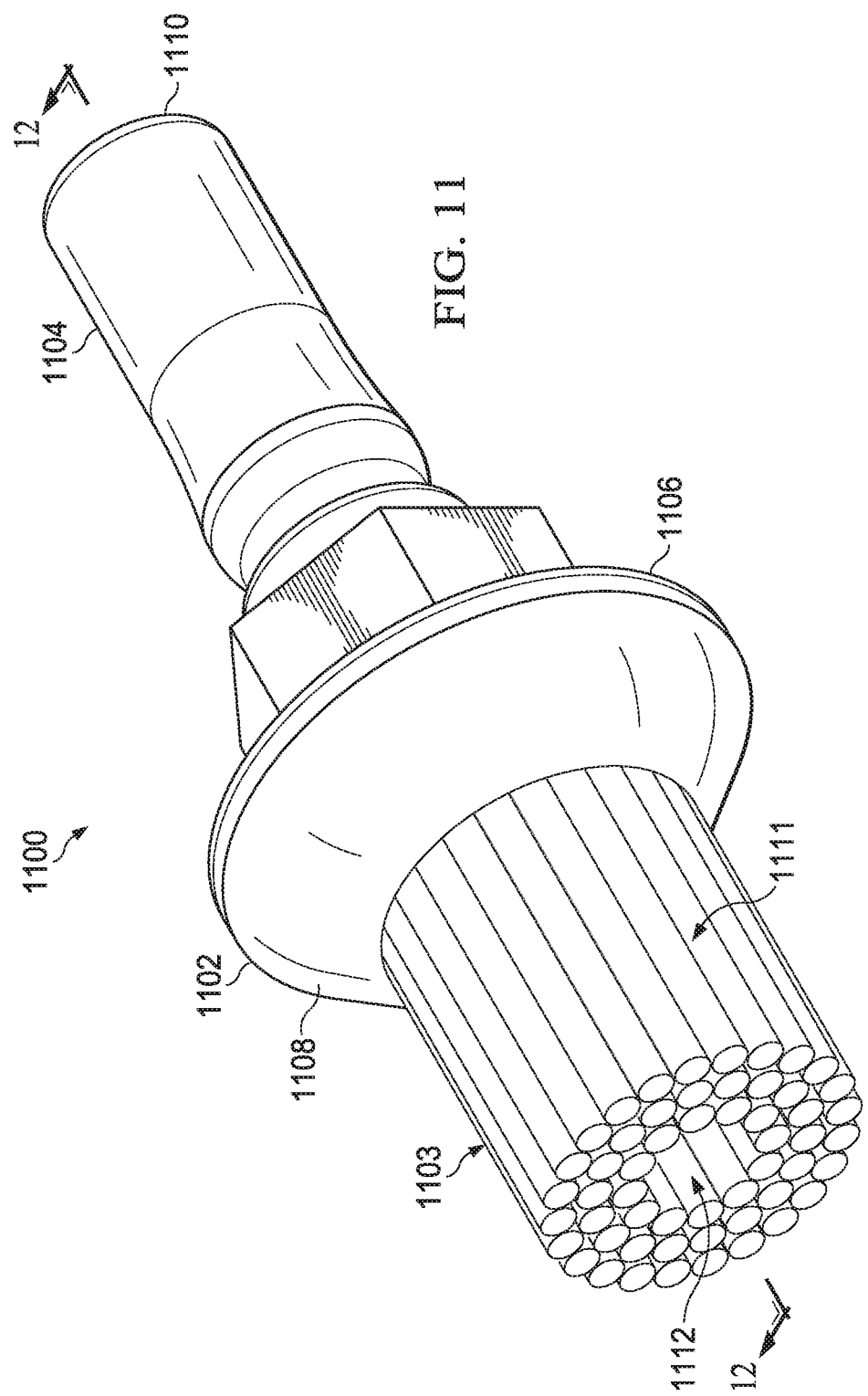
FIG. 11 is an illustration of another type of tool in accordance with an illustrative embodiment.

With reference now to FIG. 11, an illustration of another type of tool is depicted in accordance with an illustrative embodiment. In this illustrative example, tool 1100 may be an example of one implementation for tool 102 in FIG. 1. As depicted, tool 1100 may include base 1102, connector 1104, and applicator 1103. Base 1102, applicator 1103, and connector 1104 may be examples of implementations for base 122, applicator 124, and connector 128, respectively, in FIG. 1.

In this illustrative example, base 1102 may have first side 1106 and second side 1108. Connector 1104 may be associated with and extend from first side 1106 of base 1102. End 1110 of connector 1104 may be used to connect tool 1100 to an end effector (not shown), such as end effector 114 in FIG. 1.

Applicator 1103 may be associated with and extend from second side 1108 of base 1102. In this illustrative example, applicator 1103 may be implemented using plurality of bristles 1111. Plurality of bristles 1111 may be an example of one implementation for plurality of bristles 142 in FIG. 1. Applicator 1103 may have opening 1112 through applicator 1103.

Figure 12:
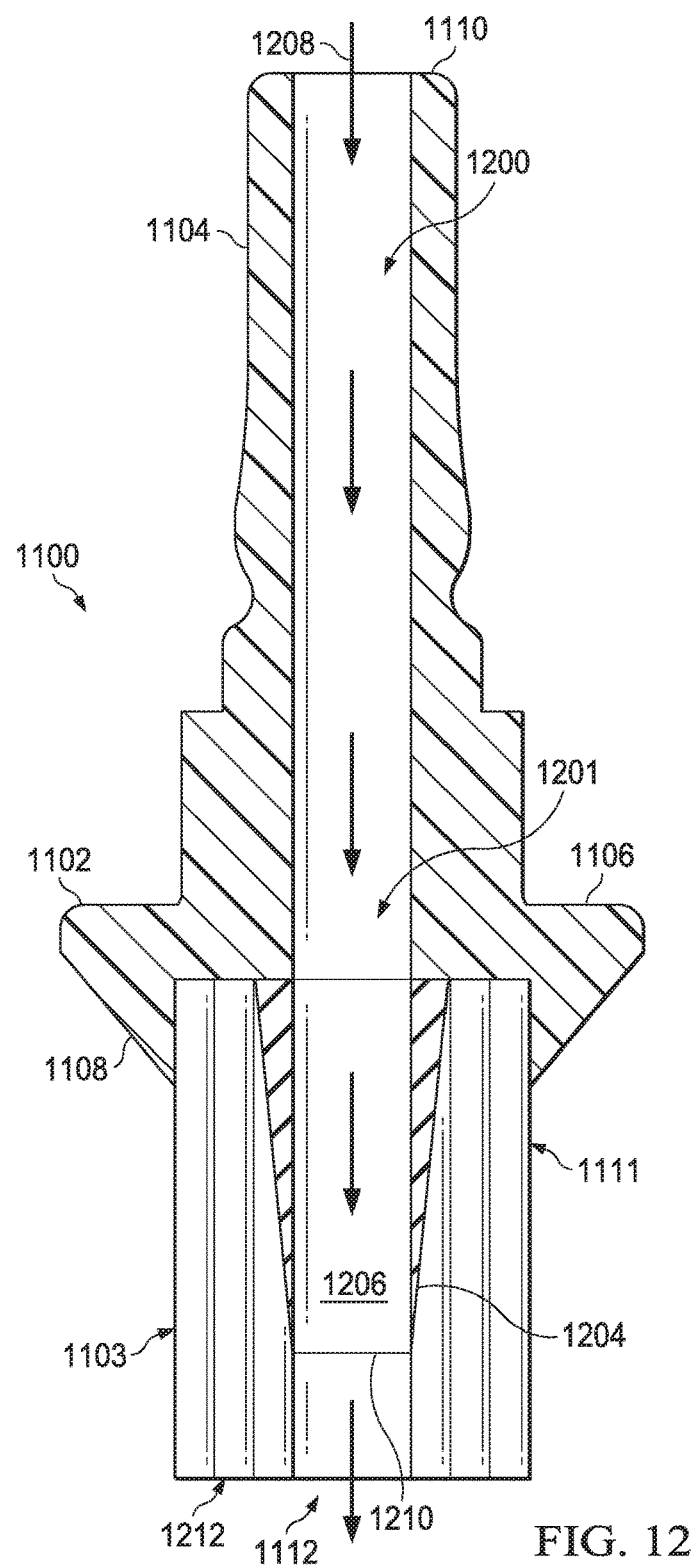
FIG. 12 is an illustration of a cross-sectional view of a tool in accordance with an illustrative embodiment.

Turning now to FIG. 12, an illustration of a cross-sectional view of tool 1100 from FIG. 11 is depicted in accordance with an illustrative embodiment. In this illustrative example, a cross-sectional view of tool 1100 from FIG. 11 is depicted taken along lines 12-12 in FIG. 11.

In FIG. 12, channel 1200 of connector 1104 may be seen. Channel 1200 may be an example of one implementation for channel 132 in FIG. 1. Further, channel 1201 in base 1102 may be seen. Channel 1201 may be an example of one implementation for number of channels 130 in FIG. 1.

Tool 1100 may also include flexible tube 1204, an example of one implementation for flexible tube 136 in FIG. 1. Flexible tube 1204 may have fluid channel 1206.

In this illustrative example, a fluid (not shown) may flow in the direction of arrow 1208 through channel 1200 of connector 1104, into and through channel 1201 of base 1102, and into and out of fluid channel 1206.

In this illustrative example, flexible tube 1204 may have end 1210 that does not extend past applicator 1103. The bristles (not shown) that form applicator 1103 may extend to a same position 1212 away from base 1102, as depicted.

Figure 13:
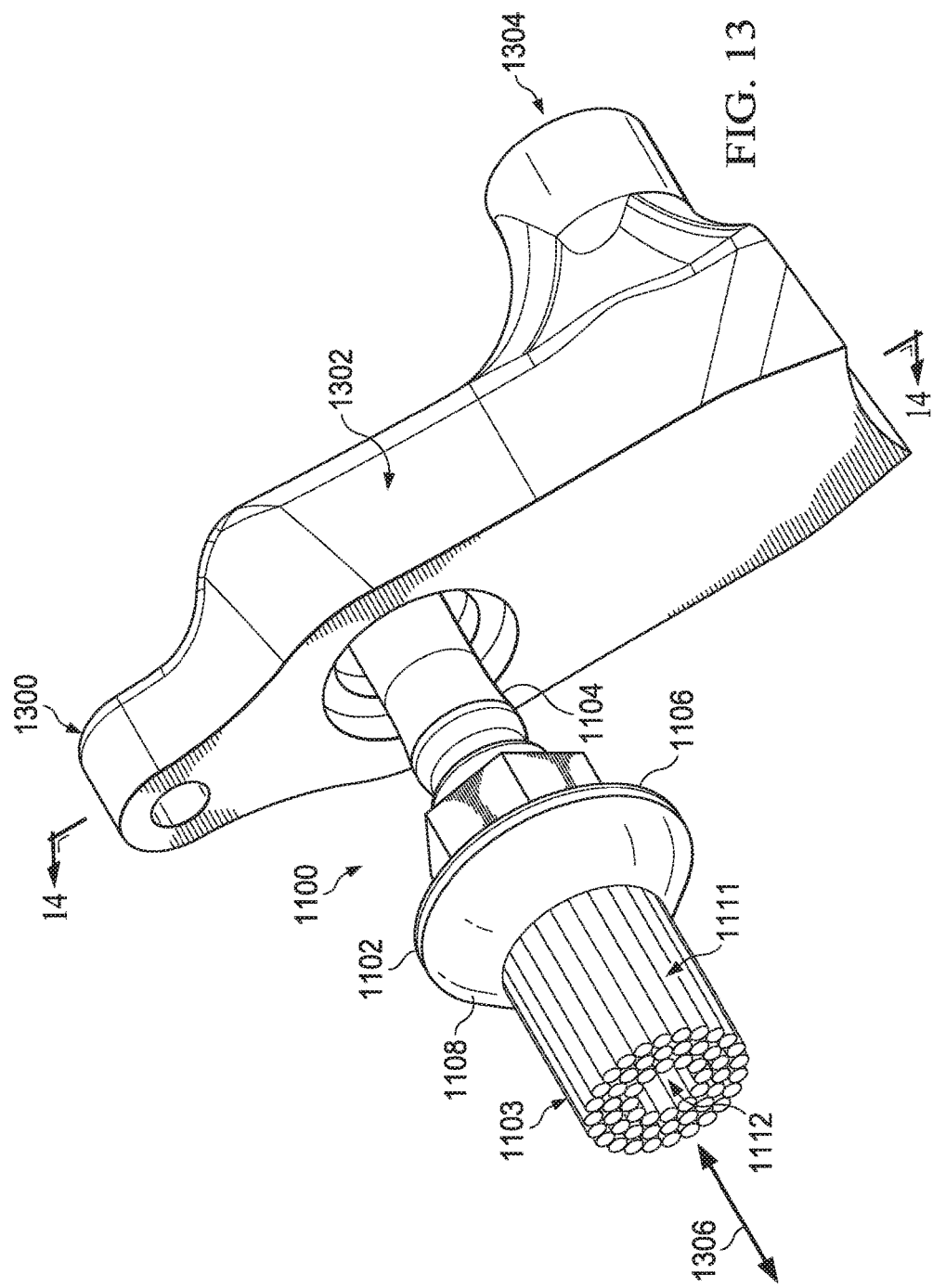
FIG. 13 is an illustration of a tool connected to a portion of an end effector in accordance with an illustrative embodiment.

With reference now to FIG. 13, an illustration of tool 1100 from FIGS. 11-12 connected to a portion of an end effector is depicted in accordance with an illustrative embodiment. In this illustrative example, connector 1104 may be used to connect tool 1100 to end effector 1300. End effector 1300 may be an example of one implementation for end effector 114 in FIG. 1. End effector 1300 may include dispensing device 1302.

Connector 1104 may be connected to end effector 1300 such that a fluid (not shown) that enters dispensing device 1302 through opening 1304 may exit dispensing device 1302 and flow into channel 1200 in FIG. 12 of connector 1104.

End effector 1300 may be configured to rotate tool 1100 in a direction around axis 1306 during fluid application operations. Fluid may flow out through opening 1112 and be applied onto any number of surfaces as tool 1100, and thereby applicator 1103, is rotated.

Figure 14:
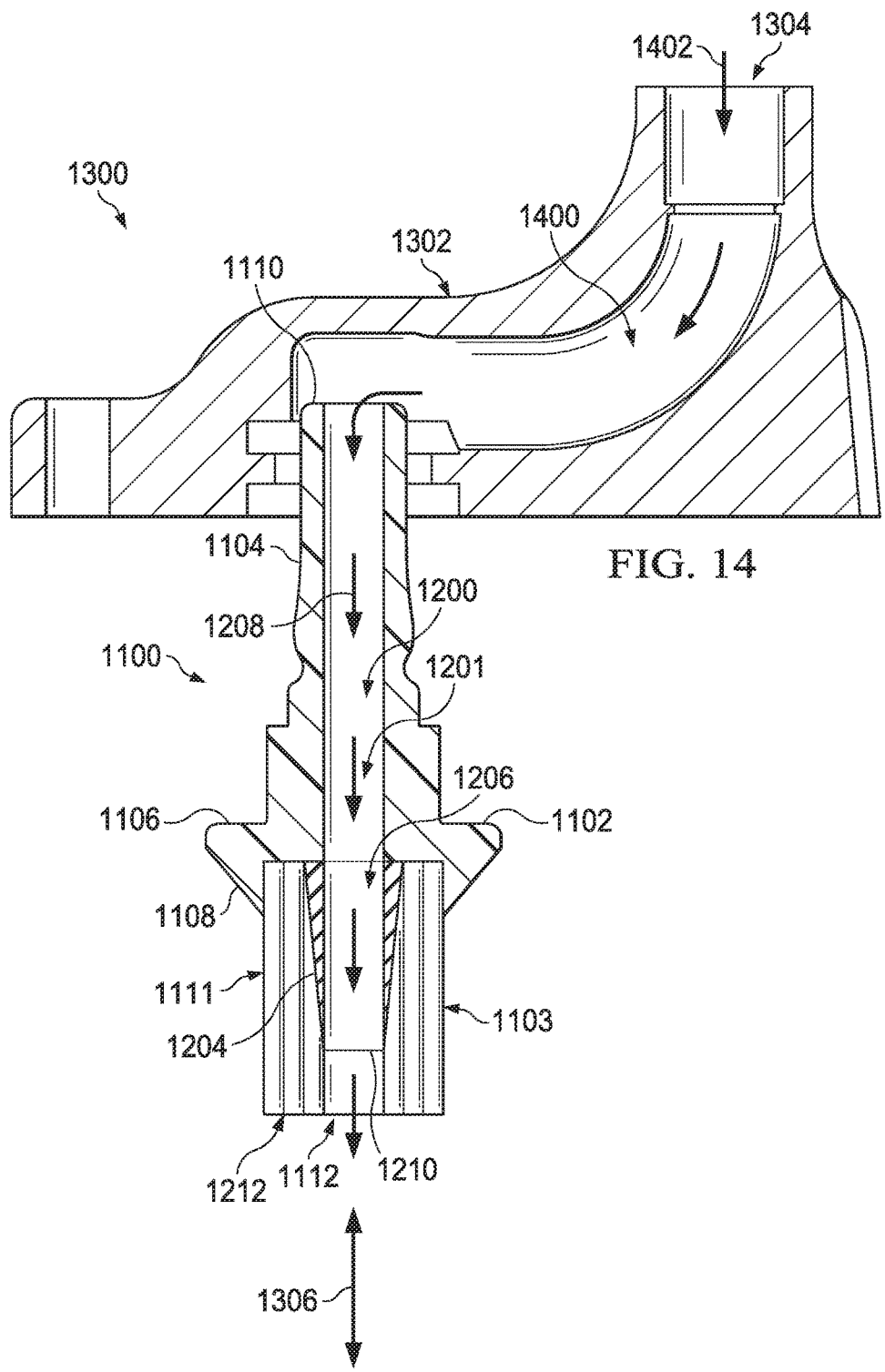
FIG. 14 is an illustration of a cross-sectional view of a tool and a portion of an end effector in accordance with an illustrative embodiment.

Turning now to FIG. 14, an illustration of a cross-sectional view of tool 1100 and the portion of end effector 1300 seen in FIG. 13 is depicted in accordance with an illustrative embodiment. In this illustrative example, a cross-sectional view of tool 1100 and end effector 1300 from FIG. 13 is depicted taken along lines 13-13 in FIG. 11. In this illustrative example, a fluid (not shown) may flow through channel 1400 in dispensing device 1302 in the direction of arrow 1402 into channel 1200 of connector 1104.

Figure 15:
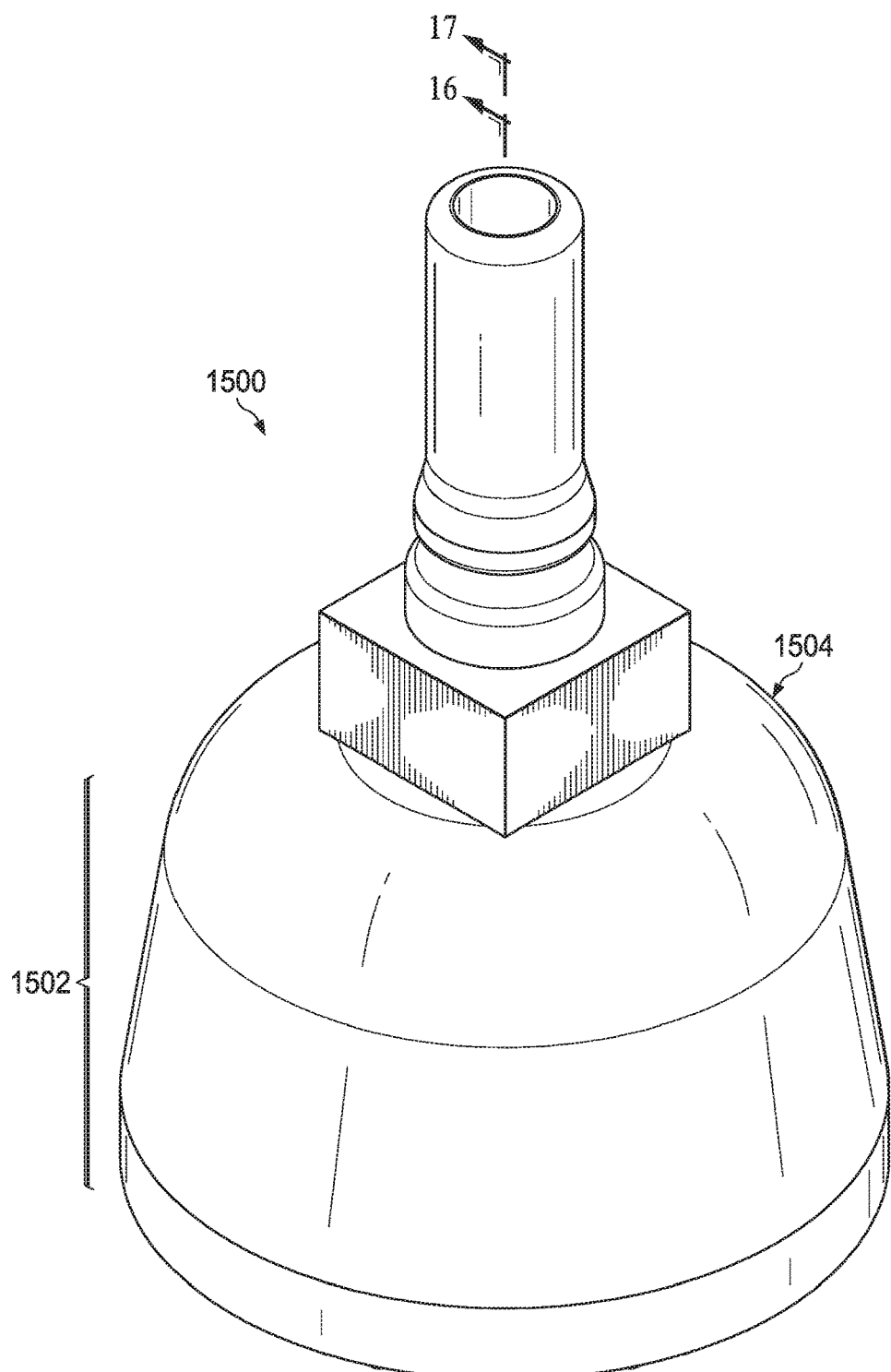
FIG. 15 is an illustration of a tool in accordance with an illustrative embodiment.

With reference now to FIG. 15, an illustration of a tool is depicted in accordance with an illustrative embodiment. In this illustrative example, tool 1500 may be implemented in a manner similar to the manner in which tool 102 from FIG. 1 is implemented. However, tool 1500 may have cover 1502 to cover the applicator (not shown) of tool 1500.

Cover 1502 may help reduce the likelihood of a fluid being applied by the applicator from spraying onto undesired surfaces. In this illustrative example, cover 1502 may be formed as part of the structure that forms base 1504 of tool 1500. In other words, cover 1502 may be a part of base 1504.

Figure 16:
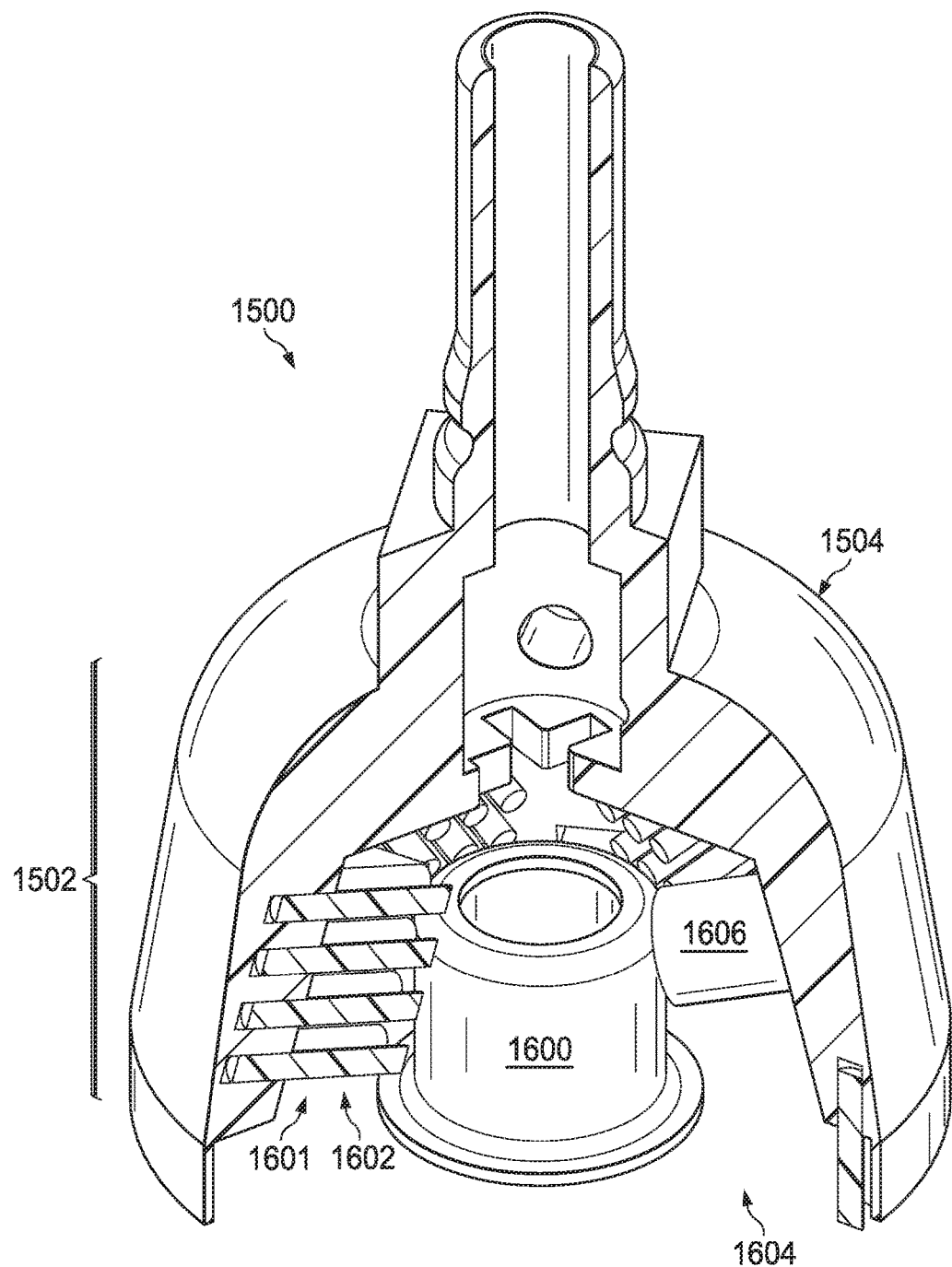
FIG. 16 is an illustration of a cross-sectional view of a tool in accordance with an illustrative embodiment.

Turning now to FIG. 16, an illustration of a cross-sectional view of tool 1500 from FIG. 15 with tool 1500 positioned over a fastener element is depicted in accordance with an illustrative embodiment. In FIG. 16, the cross-sectional view of tool 1500 from FIG. 15 is depicted taken along lines 16-16 in FIG. 15. As depicted, tool 1500 has been positioned over fastener element 1600. Fastener element 1600 may be an example of one implementation for an object in number of objects 108 in FIG. 1.

In this illustrative example, tool 1500 may have applicator 1601 comprised of plurality of bristles 1602 that may extend from base 1504 within space 1604 between base 1504 and fastener element 1600. Applicator 1601 and plurality of bristles 1602 may be an example of one implementation for applicator 124 and plurality of bristles 142, respectively, in FIG. 1.

As depicted, plurality of bristles 1602 may extend from base 1504 at varying angles and may have varying lengths. The varying angles and lengths of the bristles in plurality of bristles 1602 may be selected to ensure application of fluid over fastener element 1600 in a manner that meets selected tolerances. Further, flexible tube 1606 may be one flexible tube associated with base 1504 from which fluid may be dispensed.

Figure 17:
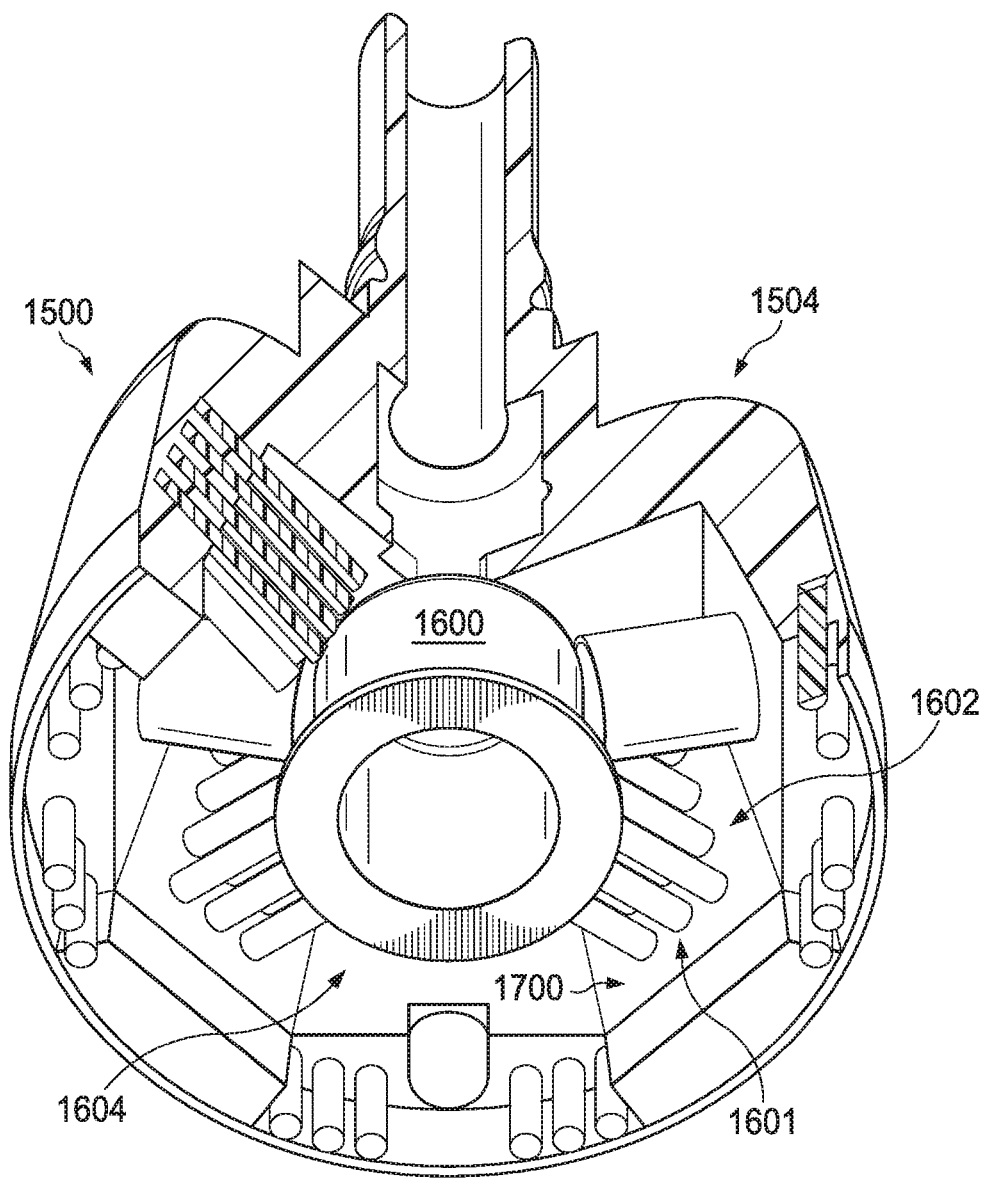
FIG. 17 is an illustration of a bottom isometric cross-sectional view of a tool in accordance with an illustrative embodiment.

With reference now to FIG. 17, an illustration of a bottom isometric cross-sectional view of tool 1500 from FIG. 16 is depicted in accordance with an illustrative embodiment. In this illustrative example, base 1504 may have inner walls 1700. More bristles in plurality of bristles 1602 may be seen in this view. As depicted, plurality of bristles 1602 may include bristles that are configured to contact fastener element 1600 as well as bristles that may be configured to contact a surface of an object (not shown) with which fastener element 1600 may be associated.

Figure 18:
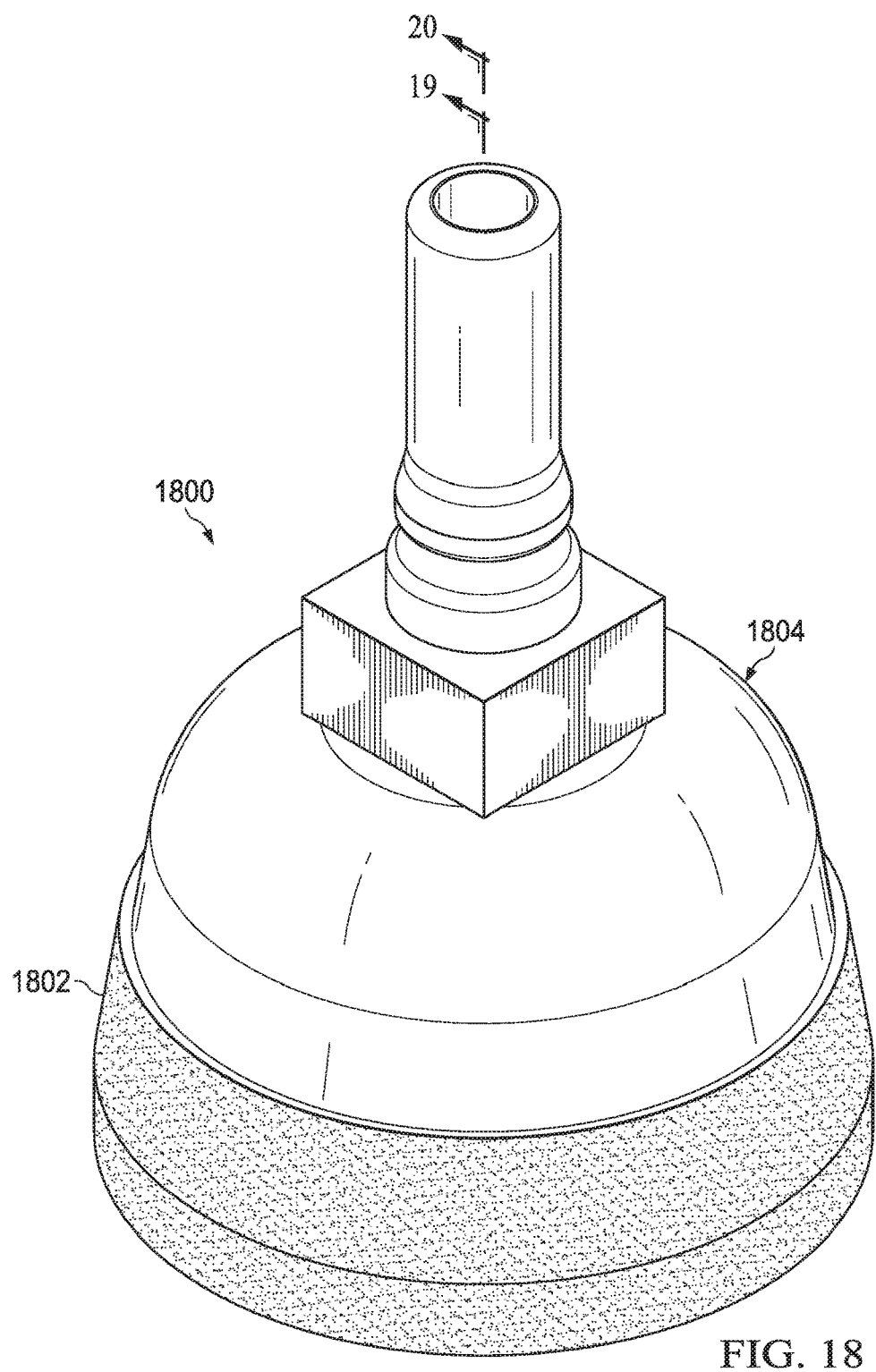
FIG. 18 is an illustration of a tool in accordance with an illustrative embodiment.

With reference now to FIG. 18, an illustration of a tool is depicted in accordance with an illustrative embodiment. In this illustrative example, tool 1800 may be implemented in a manner similar to the manner in which tool 1500 from FIG. 15 is implemented. However, tool 1800 may have cover 1802 that is removably attached to base 1804 of tool 1800. In other words, cover 1802 may be a component separate and independent of base 1804 in this illustrative example.

Cover 1802 may help reduce the likelihood of a fluid being applied by the applicator from spraying onto undesired surfaces. In this illustrative example, cover 1802 may be comprised of one or more flexible materials. In one illustrative example, cover 1802 may be referred to as a shroud.

The illustrations of tool 200 in FIGS. 2-6, tool 700 in FIGS. 7-8, tool 900 in FIGS. 9-10, tool 1100 in FIGS. 11-12, end effector 1300 in FIGS. 13-14, tool 1500 with cover 1502 in FIGS. 15-17, and tool 1800 with cover 1802 in FIG. 18 are not meant to imply physical or architectural limitations to the manner in which an illustrative embodiment may be implemented. Other components in addition to or in place of the ones illustrated may be used. Some components may be optional.

The different components shown in FIGS. 2-18 may be illustrative examples of how components shown in block form in FIG. 1 can be implemented as physical structures. Additionally, some of the components in FIGS. 2-18 may be combined with components in FIG. 1, used with components in FIG. 1, or a combination of the two.

Figure 19:
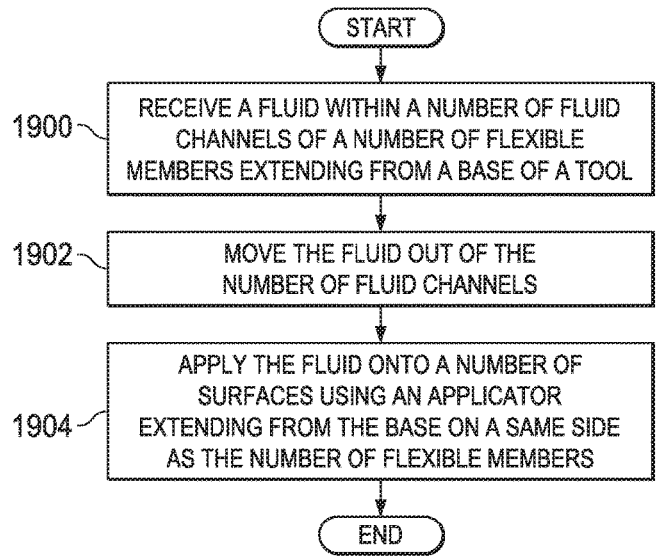
FIG. 19 is an illustration of a process for applying a fluid onto a number of surfaces in the form of a flowchart in accordance with an illustrative embodiment.

With reference now to FIG. 19, an illustration of a process for applying fluid onto a number of surfaces is depicted in the form of a flowchart in accordance with an illustrative embodiment. The process illustrated in FIG. 19 may be implemented using tool 102 in FIG. 1.

The process may begin by receiving fluid 104 within a number of fluid channels of number of flexible members 126 extending from base 118 of tool 102 (operation 1900). Next, fluid 104 may be moved out of the number of fluid channels (operation 1902). Thereafter, fluid 104 may be applied onto number of surfaces 106 using applicator 124 extending from base 122 on a same side as number of flexible members 126 (operation 1904), with the process terminating thereafter.

Figure 20:
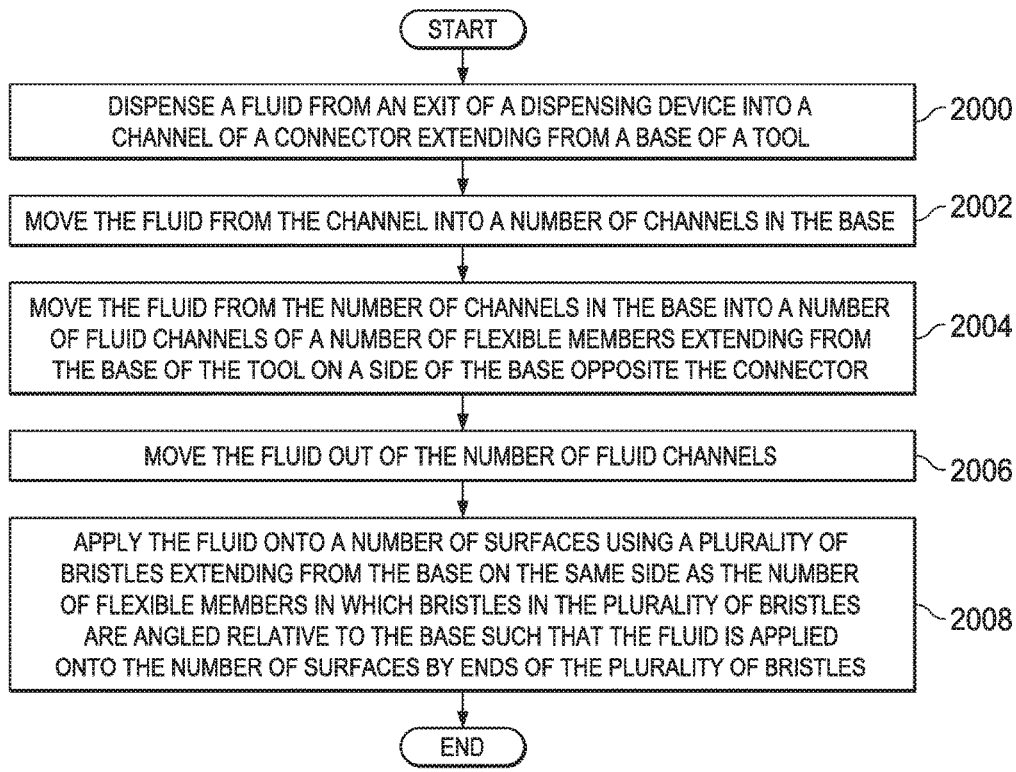
FIG. 20 is an illustration of a process for applying a fluid onto a number of surfaces in the form of a flowchart in accordance with an illustrative embodiment.

With reference now to FIG. 20, an illustration of a process for applying fluid onto a number of surfaces is depicted in the form of a flowchart in accordance with an illustrative embodiment. The process illustrated in FIG. 19 may be implemented using tool 102 in FIG. 1.

The process may begin by dispensing fluid 104 from exit 115 of dispensing device 117 into channel 130 of connector 128 extending from base 118 of tool 102 (operation 2000). Fluid 104 may then be moved from channel 132 into number of channels 130 in base 122 (operation 2002). Fluid 104 may be moved from number of channels 130 in base 122 into a number of fluid channels of number of flexible members 126 extending from base 122 of tool 102 on a side of base 122 opposite connector 128 (operation 2004). Thereafter, fluid 104 may be moved out of the number of fluid channels (operation 2006).

Next, fluid 104 may be applied onto number of surfaces 106 using plurality of bristles 142 extending from base 122 on the same side as number of flexible members 126 in which bristles in plurality of bristles 142 are angled relative to base 122 such that fluid 104 is applied onto number of surfaces 106 by ends 153 of plurality of bristles 142 (operation 2008), with the process terminating thereafter. In operation 2008, fluid 104 that has moved out of the number of fluid channels may be applied onto number of surfaces 106 using the ends, or tips, of plurality of bristles 142. In one illustrative example, the bristles in plurality of bristles 142 may have different angles relative to base 122 and/or different lengths that allow even and adequate application of fluid 104 onto number of surfaces 106 such that the coverage of number of surfaces 106 by fluid 104 meets within selected tolerances.

The illustrative embodiments of the disclosure may be described in the context of aircraft manufacturing and service method 2100 as shown in FIG. 21 and aircraft 2200 as shown in FIG. 22. Turning first to FIG. 21, an illustration of an aircraft manufacturing and service method is depicted in the form of a flowchart in accordance with an illustrative embodiment. During pre-production, aircraft manufacturing and service method 2100 may include specification and design 2102 of aircraft 2200 in FIG. 22 and material procurement 2104.

During production, component and subassembly manufacturing 2106 and system integration 2108 of aircraft 2200 in FIG. 22 takes place. Thereafter, aircraft 2200 in FIG. 22 may go through certification and delivery 2110 in order to be placed in service 2112. While in service 2112 by a customer, aircraft 2200 in FIG. 22 is scheduled for routine maintenance and service 2114, which may include modification, reconfiguration, refurbishment, and other maintenance or service.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of an aircraft is depicted in the form of a block diagram in which an illustrative embodiment may be implemented. In this example, aircraft 2200 is produced by aircraft manufacturing and service method 2100 in FIG. 21 and may include airframe 2202 with systems 2204 and interior 2206. Examples of systems 2204 include one or more of propulsion system 2208, electrical system 2210, hydraulic system 2212, and environmental system 2214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2100 in FIG. 21. In particular, fluid dispensing system 115 from FIG. 1 may be used for dispensing, for example, without limitation, sealant material 110, over various surfaces during any one of the stages of aircraft manufacturing and service method 2100. For example, without limitation, tool 102 in FIG. 1 may be used for applying sealant material onto surfaces within aircraft 2200 during at least one of component and subassembly manufacturing 2106, system integration 2108, routine maintenance and service 2114, or some other stage of aircraft manufacturing and service method 2100. Tool 102 from FIG. 1 may be used to apply sealant material onto surfaces of airframe 2202 and/or interior 2200 of aircraft 2200.

In one illustrative example, components or subassemblies produced in component and subassembly manufacturing 2106 in FIG. 21 may be fabricated or manufactured in a manner similar to components or subassemblies produced while aircraft 2200 is in service 2112 in FIG. 21. As yet another example, one or more apparatus embodiments, method embodiments, or a combination thereof may be utilized during production stages, such as component and subassembly manufacturing 2106 and system integration 2108 in FIG. 21. One or more apparatus embodiments, method embodiments, or a combination thereof may be utilized while aircraft 2200 is in service 2112 and/or during maintenance and service 2114 in FIG. 21. The use of a number of the different illustrative embodiments may substantially expedite the assembly of and/or reduce the cost of aircraft 2200.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A robotic end effector having a tool attached thereto, the tool comprising:
   a rotatable base having a number of channels, wherein the base is rotatable relative to the robotic end effector;
   a number of flexible members extending from the base in which a flexible member in the number of flexible members has a fluid channel connected to at least one of the number of channels in the base to allow a fluid flowing through the number of channels to flow out of the fluid channel; and
   an applicator extending from the base on a same side as the number of flexible members and configured to apply the fluid flowing out of the number of flexible members onto a number of surfaces.

2. The end effector of claim 1, wherein the applicator comprises:
   a plurality of bristles.

3. The end effector of claim 2, wherein at least one of the plurality of bristles is angled relative to the base at an angle different from other bristles in the plurality of bristles.

4. The end effector of claim 2, wherein the plurality of bristles includes:
   a first set of bristles configured to apply the fluid onto a first surface in the number of surfaces;
   a second set of bristles configured to apply the fluid onto a second surface in the number of surfaces; and
   a third set of bristles configured to apply the fluid onto a third surface in the number of surfaces.

5. The end effector of claim 2, wherein the plurality of bristles includes:
   a first set of bristles extending to a first position located a first distance away from the base; and
   a second set of bristles extending to a second position located a second distance away from the base.

6. The end effector of claim 1 further comprising:
   a connector associated with the base and having a channel configured to connect the number of channels in the base to an exit of a dispensing device on a side of the base opposite the applicator.

7. The end effector of claim 1, wherein each flexible member in the number of flexible members has an end that does not extend past the applicator.

8. The end effector of claim 1, wherein the applicator comprises:
   at least one of a number of brushes, a number of sponges, a plurality of bristles, a plurality of wires, or a plurality of filaments.

9. The end effector of claim 1, further comprising:
   a fluid sealant material having a viscosity greater than a selected threshold.

10. The end effector of claim 9, wherein the fluid sealant flowing out of the number of flexible members is applied onto the number of surfaces by ends of the plurality of bristles.

11. The end effector of claim 10, wherein lengths of bristles in the plurality of bristles and angles of the bristles in the plurality of bristles relative to the base are varied such that the fluid sealant is applied onto the number of surfaces by the ends of the plurality of bristles.

12. The end effector of claim 9, wherein the fluid is configured to flow from the exit of the dispensing device, through the channel in the connector, through the number of channels in the base, and into the fluid channel of the flexible member.

13. The end effector of claim 9, wherein the selected threshold is about 500 centipoise.

14. A robotic end effector having a rotatable tool attached thereto, the tool comprising:
   a base having a number of channels, wherein the base is rotatable relative to the robotic end effector;
   a number of flexible members extending from the base in which a flexible member in the number of flexible members has a fluid channel connected to at least one of the number of channels in the base to allow a fluid flowing through the number of channels to flow out of the fluid channel; and
   a plurality of bristles extending from the base on a same side as the number of flexible members and configured to apply the fluid flowing out of the number of flexible members onto a number of surfaces in which lengths of bristles in the plurality of bristles and angles of the bristles in the plurality of bristles relative to the base are varied such that the fluid is applied onto the number of surfaces by ends of the plurality of bristles.

15. A method for applying a fluid onto a number of surfaces, the method comprising:
   receiving the fluid within a number of fluid channels of a number of flexible members extending from a base of a tool attached to a robotic end effector, wherein the base is rotatable relative to the robotic end effector;
   moving the fluid out of the number of fluid channels; and
   applying the fluid onto the number of surfaces by rotating, via the robotic end effector, an applicator extending from the base on a same side as the number of flexible members.

16. The method of claim 15, wherein applying the fluid onto the number of surfaces using the applicator comprises:
   applying the fluid onto the number of surfaces by rotating a plurality of bristles extending from the base on the same side as the number of flexible members.

17. The method of claim 16, wherein applying the fluid onto the number of surfaces using the plurality of bristles comprises:
   applying the fluid onto the number of surfaces using ends of the plurality of bristles.

18. The method of claim 17, wherein applying the fluid onto the number of surfaces using the ends of the plurality of bristles comprises:
   applying the fluid onto the number of surfaces using the ends of the plurality of bristles, wherein lengths of bristles in the plurality of bristles and angles of the bristles in the plurality of bristles relative to the base are varied such that the fluid is applied onto number of surfaces by the ends of the plurality of bristles.

19. The method of claim 16, wherein applying the fluid onto the number of surfaces using the applicator comprises:
   applying the fluid onto the number of surfaces using the plurality of bristles extending from the base on the same side as the number of flexible members, wherein at least one of the plurality of bristles is angled relative to the base at an angle different from other bristles in the plurality of bristles.

20. The method of claim 16, wherein applying the fluid onto the number of surfaces using the applicator comprises:
   applying the fluid onto a first surface in the number of surfaces using a first set of bristles in the plurality of bristles;
   applying the fluid onto a second surface in the number of surfaces using a second set of bristles in the plurality of bristles; and
   applying the fluid onto a third surface in the number of surfaces using a third set of bristles in the plurality of bristles.

21. The method of claim 15 further comprising:
   receiving the fluid within a channel in a connector associated with the base from an exit of a dispensing device.

22. The method of claim 21 further comprising:
   receiving the fluid within the number of channels in the base from the channel in the connector in which the connector is associated with a side of the base opposite the applicator.

23. The method of claim 15, wherein receiving the fluid within the number of fluid channels of the number of flexible members extending from the base comprises:
   receiving the fluid within the number of fluid channels of the number of flexible members extending from the base in which the fluid has a viscosity greater than a selected threshold.

24. The method of claim 15, wherein applying the fluid onto the number of surfaces using the applicator comprises:
   applying the fluid onto the number of surfaces using at least one of a number of brushes, a number of sponges, a plurality of bristles, a plurality of wires, or a plurality of filaments.

25. The method of claim 15, wherein applying the fluid onto the number of surfaces using the applicator comprises:
   applying the fluid onto the number of surfaces, wherein the fluid is a sealant material.

26. A method for applying a fluid onto a number of surfaces, the method comprising:

dispensing the fluid from an exit of a dispensing device into a channel of a connector extending from a base of a tool attached to a robotic end effector;

moving the fluid from the channel into a number of channels in the base;

moving the fluid from the number of channels in the base into a number of fluid channels of a number of flexible members extending from the base of the tool on a side of the base opposite the connector;

moving the fluid out of the number of fluid channels; and applying the fluid onto the number of surfaces using the robotic end effector to rotate a plurality of bristles extending from the base on a same side as the number of flexible members in which lengths of bristles in the plurality of bristles and angles of the bristles in the plurality of bristles relative to the base are varied such that the fluid is applied onto the number of surfaces by ends of the plurality of bristles.

\* \* \* \* \*